(12) United States Patent
Godefroid et al.

(10) Patent No.: US 10,983,853 B2
(45) Date of Patent: Apr. 20, 2021

(54) MACHINE LEARNING FOR INPUT FUZZING

(71) Applicant: Microsoft Technology Licensing, LLC, Redmond, WA (US)

(72) Inventors: Patrice Godefroid, Mercer Island, WA (US); Rishabh Singh, Kirkland, WA (US); Hila Peleg, Tel Aviv (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 965 days.

(21) Appl. No.: 15/638,938

(22) Filed: Jun. 30, 2017

(65) Prior Publication Data
US 2018/0285186 A1 Oct. 4, 2018

Related U.S. Application Data

(60) Provisional application No. 62/479,613, filed on Mar. 31, 2017.

(51) Int. Cl.
*G06F 11/07* (2006.01)
*H04L 29/06* (2006.01)
(Continued)

(52) U.S. Cl.
CPC ...... *G06F 11/0751* (2013.01); *G06F 11/3604* (2013.01); *G06F 11/3684* (2013.01); *G06N 3/0445* (2013.01); *G06N 3/0472* (2013.01); *G06N 3/088* (2013.01); *G06N 7/046* (2013.01); *G06N 20/00* (2019.01); *H04L 63/1433* (2013.01); *G06F 11/362* (2013.01);
(Continued)

(58) Field of Classification Search
CPC ............. G06F 11/0751; G06F 11/3604; G06F 11/3612; G06F 11/362; G06F 11/3684; G06F 40/216; G06F 40/44; G06N 20/00; G06N 3/0445; G06N 3/0472; G06N 3/088; G06N 7/046; H04L 63/1433
See application file for complete search history.

(56) References Cited

U.S. PATENT DOCUMENTS 8,417,993 B2 4/2013 O'Leary
9,098,621 B2 8/2015 Zheng et al.
(Continued)

FOREIGN PATENT DOCUMENTS

WO 2014082908 A1 6/2014

OTHER PUBLICATIONS

Shahbazi et al., "Black-Box String Test Case Generation through a Multi-Objective Optimization", Apr. 2016, IEEE Transactions on Software Engineering, vol. 42, No. 4, pp. 361-378 (Year: 2016).*
(Continued)

*Primary Examiner* — Kamran Afshar
*Assistant Examiner* — Brent Johnston Hoover

(57) ABSTRACT

Provided are methods and systems for automatically generating input grammars for grammar-based fuzzing by utilizing machine-learning techniques and sample inputs. Neural-network-based statistical learning techniques are used for the automatic generation of input grammars. Recurrent neural networks are used for learning a statistical input model that is also generative in that the model is used to generate new inputs based on the probability distribution of the learnt model.

20 Claims, 15 Drawing Sheets

(51) Int. Cl.
G06F 11/36 (2006.01)
G06N 20/00 (2019.01)
G06N 7/04 (2006.01)
G06N 3/08 (2006.01)
G06N 3/04 (2006.01)
G06F 40/44 (2020.01)
G06F 40/216 (2020.01)

(52) U.S. Cl.
CPC ........ G06F 11/3612 (2013.01); G06F 40/216 (2020.01); G06F 40/44 (2020.01)

(56) References Cited

U.S. PATENT DOCUMENTS

| | | | | |
|---|---|---|---|---|
| 2011/0099013 | A1* | 4/2011 | Melamed | G10L 17/04 704/255 |
| 2015/0019216 | A1* | 1/2015 | Singh | G06F 40/18 704/235 |
| 2015/0106091 | A1* | 4/2015 | Wetjen | H04M 3/568 704/235 |
| 2017/0220751 | A1* | 8/2017 | Davis | A61M 5/14244 |

OTHER PUBLICATIONS

Afshan et al., "Evolving Readable String Test Inputs Using a Natural Language Model to Reduce Human Oracle Cost", 2013, 2013 IEEE Sixth International Conference on Software Testing, Verification and Validation, pp. 352-361 (Year: 2013).*
Godefroid et al., "Grammar-based Whitebox Fuzzing", Jun. 13, 2008, PLDI'08 , pp. 206-215 (Year: 2008).*
Yuan et al., "A New Method of Information Extraction From PDF File", Aug. 21, 2005, Proceedings of the Fourth International Conference on Machine Learning and Cybernetics, Guangzhou, pp. 1738-1742 (Year: 2005).*
Maiorca et. al., "Looking at the Bag is not Enough to Find the Bomb: An Evasion of Structural Methods for Malicious PDF Files Detection", May 10, 2013, ASIA CCS'13, pp. 119-129 (Year: 2013).*
Kim, et al., "Automatic and lightweight grammar generation for fuzz testing", In Journal of Computers & Security, vol. 36, Jul. 2013, pp. 1-11.
Guo, et al., "GramFuzz: Fuzzing Testing of Web Browsers Based on Grammar Analysis and Structural Mutation", In Proceedings of Second International Conference on Informatics and Applications, Sep. 23, 2013, pp. 212-215.
Shu, et al., "Detecting Communication Protocol Security Flaws by Formal Fuzz Testing and Machine Learning", In Proceedings of International Conference on Formal Techniques for Networked and Distributed Systems, Jun. 10, 2008, pp. 299-304.
Sparks, et al., "Automated Vulnerability Analysis—Leveraging Control Flow for Evolutionary Input Crafting", In Proceedings of 23rd Annual Computer Security Applications Conference, Dec. 2007, pp. 477-486.
Duchene, et al., "KameleonFuzz—Evolutionary Fuzzing for Black-Box XSS Detection", In Proceedings of the 4th ACM conference on Data and application security and privacy, Mar. 3, 2014, 12 pages.
Kifetew, et al., "Generating Valid Grammar-based Test Inputs by means of Genetic Programming and Annotated Grammars", In Journal of Empirical Software Engineering, Jan. 14, 2016, 31 pages.
"Adobe Systems Incorporated", http://www.adobe.com/content/dam/Adobe/en/devnet/acrobat/pdfs/pdf_reference_1-7.pdf, Published on: Nov., 2006, 1310 pages.
Bastani, et al., "Synthesizing program input grammars", In Journal of Computing Research Repository, Aug. 2016, pp. 1-17.
Bhatia, et al., "Automated correction for syntax errors in programming assignments using recurrent neural networks", In Journal of Computing Research Repository, Mar. 2016, 11 pages.
Bunel, et al., "Adaptive neural compilation", In Journal of Annual Conference on Neural Information Processing Systems, Dec. 5, 2016, pp. 1-25.
Cho, et al., "Learning phrase representations using RNN encoder-decoder for statistical machine translation", In Proceedings of the Conference on Empirical Methods in Natural Language Processing, Oct. 25, 2014, 15 pages.
Chorowski, et al., "Attention-based models for speech recognition", In Journal of Advances in Neural Information Processing Systems, Dec. 7, 2015, pp. 1-19.
Claessen, et al., "QuickCheck: A Lightweight Tool for Random Testing of Haskell Programs", In Proceedings of the fifth ACM SIGPLAN international conference on Functional programming, Sep. 1, 2000, pp. 268-279.
Coppit, et al., "yagg: an easy-to-use generator for structured test inputs", In Proceedings of the 20th IEEE/ACM international conference on Automated software engineering, Nov. 7, 2005, pp. 356-359.
Cui, et al., "Tupni: Automatic reverse engineering of input formats", In Proceedings of the 15th ACM conference on Computer and communications security, Oct. 27, 2008, pp. 391-402.
Daniel, et al., "Automated testing of refactoring engines", In Proceedings of ACM SIGSOFT symposium on the foundations of software engineering, Sep. 3, 2007, pp. 185-194.
Godefroid, et al., "Grammar-based Whitebox Fuzzing", In Proceedings of the 29th ACM SIGPLAN Conference on Programming Language Design and Implementation, Jun. 7, 2008, pp. 206-215.
Godefroid, et al., "Automated Whitebox Fuzz Testing", In Proceedings of the Network and Distributed System Security Symposium, Feb. 13, 2008., 16 pages.
Gupta, et al., "Deepx: Fixing common c language errors by deep learning", In Proceedings of the Thirty-First AAAI Conference on Artificial Intelligence, Feb. 4, 2017, 7 pages.
K.V. Hanford, "Automatic Generation of Test Cases", In IBM Systems Journal, vol. 9, No. 4, 1970, pp. 242-257.
Hochreiter, et al., "Long short-term memory", In Journal of Neural Computation, vol. 9, Issue 8, Nov. 15, 1997, pp. 1-32.
Hoschele, et al., "Mining Input Grammars from Dynamic Taints", In Proceedings of 31st IEEE/ACM International Conference on Automated Software Engineering, Sep. 3, 2016, pp. 720-725.
Kurach, et al., "Neural random-access machines", In Journal of Computing Research Repository, Nov. 2015, pp. 1-17.
Lammel, et al., "Controllable combinatorial coverage in grammar-based testing", In Proceedings IFIP International Conference on Testing of Communicating Systems, May 2006, 18 pages.
Majumdar, et al., "Directed Test Generation using Symbolic Grammars", In Proceedings of the twenty-second IEEE/ACM international conference on Automated software engineering, Nov. 5, 2007, pp. 134-143.
Maurer, Peter M., "Generating test data with enhanced context-free grammars", In Journal of IEEE Software, vol. 7, Issue 4 , Jul. 1990, pp. 50-55.
Parisotto, et al., "Neuro-symbolic program synthesis", In Journal of Computing Research Repository, Nov. 2016, pp. 1-14.
Pu, et al., "sk p: a neural program corrector for moocs", In Journal of Computing Research Repository, Jul. 2016, pp. 1-12.
Paul Purdom, "A sentence generator for testing parsers", In Journal of BIT Numerical Mathematics, vol. 12, Issue 3, Sep. 1972, pp. 366-375.
Reed, et al., "Neural programmer-interpreters", In Journal of Computing Research Repository, Nov. 2015, pp. 1-13.
Sirer, et al., "Using production grammars in software testing", In Proceedings of the 2nd conference on Domain-specific languages, Oct. 3, 1999, pp. 1-13.
Sutskever, et al., "Sequence to sequence learning with neural networks", In Journal of Advances in neural information processing systems, Dec. 8, 2014, pp. 1-9.
Sutton, et al., "Fuzzing: Brute Force Vulnerability Discovery", In Publication of Addison-Wesley, Jul. 9, 2007.
Utting, et al., "A Taxonomy of Model-Based Testing", In Working Paper, Apr. 3006, Department of Computer Science, University of Waikato, Apr. 2006, pp. 1-18.

* cited by examiner

◄ 300

320 ◄

```
trailer
<<
/Size 18
/Info 17 0 R
/Root 10 R
>>
startxref
3661
```

315 ◄

```
xref
0 6
0000000000 65535 f
0000000010 000000 n
0000000059 000000 n
0000000118 000000 n
0000000296 000000 n
0000000377 000000 n
0000000395 000000 n
```

310 ◄

```
2 0 obj
<<
/Type /Pages
/Kids [ 3 0 R ]
/Count 1
>>
endobj
```

410
125 0 obj
[680.6 680.6]
endobj 415
88 0 obj
(Related Work)
endobj 420
75 0 obj
4171
endobj 425
47 1 obj
[false 170 85.5 (Hello) /My#20Name]
endobj

FIG. 4

SampleFuzz($D(x, \theta), t_{fuzz}, p_t$)
seq := "obj"
while ¬ seq.endswith("endobj") do
   c,p(c) := sample($D$(seq,$\theta$)) (* Sample c from the learnt distribution *)
   $p_{fuzz}$ := random(0, 1) (* random variable to decide whether to fuzz *)
   if $p_{fuzz} > t_{fuzz} \wedge p(c) > p_t$ then
     c := argmin$_{c'}\{p(c') \sim D$(seq,$\theta$)$\}$ (* replace c by c' (with lowest likelihood) *)
   end if
   seq := seq + c
   if len(seq) > MAXLEN then
     seq := "obj" (* Reset the sequence *)
   end if
end while
return seq

FIG. 6

| Row\Column | Sample-40e | SampleSpace-40e | baseline123 | host123 |
|---|---|---|---|---|
| Sample-40e | 0 | 10,799 | 6,658 | 65,442 |
| SampleSpace-40e | 1,680 | 0 | 3,393 | 56,323 |
| baseline123 | 660 | 6,514 | 0 | 50,444 |
| host123 | 188 | 781 | 223 | 0 |

MACHINE LEARNING FOR INPUT FUZZING

This application claims the benefit of U.S. Provisional Patent Application No. 62/479,613, entitled "Learn&Fuzz: Machine Learning For Input Fuzzing," filed on Mar. 31, 2017, which is hereby expressly incorporated herein by reference in its entirety.

BACKGROUND

"Fuzzing" is the process of finding security vulnerabilities in input-parsing code by repeatedly testing the parser with modified, or "fuzzed," inputs. The main types of fuzzing techniques in use today include, for example: (1) blackbox random fuzzing, (2) whitebox constraint-based fuzzing, and (3) grammar-based fuzzing, which can be viewed as a variant of model-based testing.

Blackbox random fuzzing and whitebox constraint-based fuzzing are fully-automated techniques, and have historically proved to be very effective at finding security vulnerabilities in binary-format file parsers. On the other hand, existing techniques for grammar-based fuzzing are not fully automatic, but instead require an input grammar specifying the input format of the application under test. This grammar is typically written by hand, which is a laborious, time-consuming, and error-prone process. In addition, grammars for richer objects such as PDF are nearly impossible to write by hand. Nevertheless, grammar-based fuzzing is the most effective fuzzing technique known today for fuzzing applications with complex structured input formats such as, for example, web-browsers, which must take as (untrusted) inputs web-pages including complex HTML documents and JavaScript code.

SUMMARY

The following introduces a selection of concepts in a simplified form in order to provide a foundational understanding of some aspects of the present disclosure. The following is not an extensive overview of the disclosure, and is not intended to identify key or critical elements of the disclosure or to delineate the scope of the disclosure. The following merely presents some of the concepts of the disclosure as a prelude to the more detailed description provided thereafter.

The present disclosure relates generally to testing computer code and, more particularly, to techniques for generating input grammars for grammar-based fuzzing.

Embodiments of the present disclosure relate to methods and systems for automatically generating input grammars for grammar-based fuzzing. In at least one embodiment, input grammars for grammar-based fuzzing are generated using machine-learning techniques and sample inputs. In an embodiment, the method utilizes neural networks for learning a generative model of complex structured inputs. The method generates fuzzing inputs by incorporating additional noise from the learnt input model, according to an embodiment.

One embodiment of the present disclosure relates to a method for generating input for testing an application, the method comprising: receiving as input, (i) a learnt distribution model, (ii) a probability of fuzzing a character, and (iii) a threshold probability for modifying predicted characters; sampling the learnt distribution model to generate (i) a candidate next character in a sequence and (ii) a probability of the candidate next character being an actual next character in the sequence; and responsive to determining that the probability of the candidate next character being the actual next character in the sequence is greater than the threshold probability for modifying predicted characters, sampling the learnt distribution model to generate a new candidate next character in the sequence.

Another embodiment of the present disclosure relates to a system for generating input for testing an application, the system comprising one or more processors, and one or more non-transitory memories coupled to the one or more processors, the one or more memories storing machine readable instructions that, when executed by the one or more processors, cause a system to perform operations comprising: receiving as input, (i) a learnt distribution model, (ii) a probability of fuzzing a character, and (iii) a threshold probability for modifying predicted characters; sampling the learnt distribution model to generate (i) a candidate next character in a sequence and (ii) a probability of the candidate next character being an actual next character in the sequence; and responsive to determining that the probability of the candidate next character being the actual next character in the sequence is greater than the threshold probability for modifying predicted characters, sampling the learnt distribution model to generate a new candidate next character in the sequence.

Yet another embodiment of the present disclosure relates to a tangible, non-transitory computer readable medium storing machine readable instructions that, when executed by one or more processors, cause the one or more processors to perform operations comprising: receiving as input, (i) a learnt distribution model, (ii) a probability of fuzzing a character, and (iii) a threshold probability for modifying predicted characters; sampling the learnt distribution model to generate (i) a candidate next character in a sequence and (ii) a probability of the candidate next character being an actual next character in the sequence; and responsive to determining that the probability of the candidate next character being the actual next character in the sequence is greater than the threshold probability for modifying predicted characters, sampling the learnt distribution model to generate a new candidate next character in the sequence.

Further scope of applicability of the methods and systems of the present disclosure will become apparent from the more detailed description given below. However, it should be understood that the following detailed description and specific examples, while indicating embodiments of the methods and systems, are given by way of illustration only, since various changes and modifications within the spirit and scope of the concepts disclosed herein will become apparent to those skilled in the art from the following detailed description.

BRIEF DESCRIPTION OF THE DRAWINGS

These and other objects, features, and characteristics of the present disclosure will become more apparent to those skilled in the art from a study of the detailed description that follows in conjunction with the appended claims and drawings, all of which form a part of this disclosure. In the drawings:

FIG. 3 illustrates example excerpts of a portable document format (PDF) document;

FIG. 4 illustrates example PDF data objects of different types;

FIG. 6 illustrates an example process for performing fuzzing while sampling new objects, according to one or more embodiments described herein;

FIG. 13 illustrates a table comparing example instruction coverages, according to one or more embodiments described herein;

Figure 1:
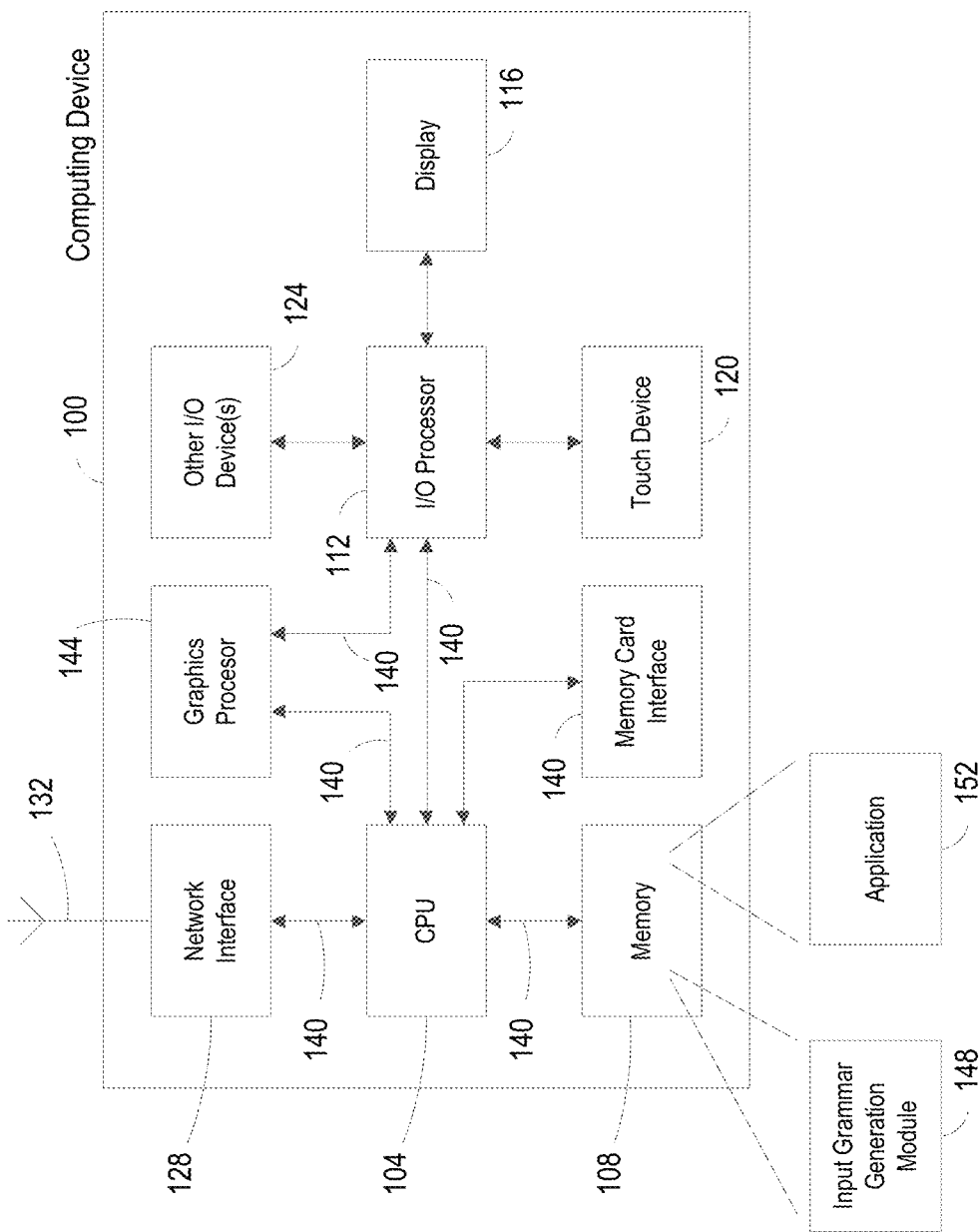
FIG. 1 is a block diagram of an example computing device configured to implement input grammar generation techniques described herein, according to one or more embodiments.

The headings provided herein are for convenience only and do not necessarily affect the scope or meaning of what is claimed in the present disclosure.

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

As described above, "fuzzing" consists of repeatedly testing an application with modified, or "fuzzed," inputs with the goal of finding security vulnerabilities in input-parsing code. The present disclosure provides methods and systems for automating the generation of an input grammar suitable for input fuzzing using sample inputs and neural-network-based statistical machine-learning techniques. While some embodiments and examples are described with respect to a complex input format, namely portable document format (PDF), and a large complex security-critical parser for this format, it should be understood by those of ordinary skill in the art that the method and systems provided may be utilized in connection with various other input format types.

The present disclosure describes (and through several examples, measures) the tension between conflicting learning and fuzzing goals: learning wants to capture the structure of well-formed inputs, while fuzzing wants to break that structure in order to cover unexpected code paths and find bugs. The present disclosure also describes a new computational process (e.g., algorithm) that accounts for this tension between learning and fuzzing, where the process uses a learnt input probability distribution to intelligently guide where to fuzz inputs, according to some embodiments.

To further demonstrate the effectiveness and some of the unique advantages of the methods and systems provided, the following description also presents an evaluation of the methods and systems for a very complex input format, namely, PDF, and a large complex security-critical parser for this format (e.g., a PDF parser embedded in a recently released web browser). A series of detailed experiments addresses the challenge of how to learn and then generate diverse, well-formed inputs to maximize parser-code coverage, while still injecting enough ill-formed input parts to exercise unexpected code paths and error-handling code.

FIG. 1 is a diagram of an example computing device 100 (e.g., mobile computing device) that may implement an input grammar generation module configured to automatically generate an input grammar suitable for input fuzzing using sample inputs and neural-network-based statistical machine-learning techniques, according to some embodiments. The device 100 includes one or more central processing units (CPUs) 104 (hereinafter referred to as "the CPU 104" for purposes of brevity) coupled to a memory 108 (which can include one or more computer readable storage media such as random access memory (RAM), read only memory (ROM), FLASH memory, a hard disk drive, a digital versatile disk (DVD) disk drive, a Blu-ray disk drive, etc.). The device also includes one or more input/output (I/O) processors 112 (hereinafter referred to as "the I/O processor 112" for purposes of brevity) that interfaces the CPU 104 with a display device 116 and a touch-sensitive device or touchscreen 120 (e.g., a single-touch or multi-touch touchscreen). The I/O processor 112 also may interface one or more additional I/O devices 124 to the CPU 104, such as one or more buttons, click wheels, a keyboard, a keypad, a touch pad, another touchscreen (single-touch or multi-touch), lights, a speaker, a microphone, etc.

A network interface 128 is coupled to the CPU 104 and to one or more antennas 132. A memory card interface 136 is coupled to the CPU 104. The memory card interface 136 is adapted to receive a memory card such as a secure digital (SD) card, a miniSD card, a microSD card, a Secure Digital High Capacity (SDHC) card, etc., or any suitable card.

The CPU 104, the memory 108, the I/O processor 112, the network interface 128, and the memory card interface 136 are coupled to one or more busses 140. For example, the CPU 104, the memory 108, the I/O processor 112, the network interface 128, and the memory card interface 136 are coupled to a single bus 140, in an embodiment. In another embodiment, the CPU 104 and the memory 108 are coupled to a first bus, and the CPU 104, the I/O processor 112, the network interface 128, and the memory card interface 136 are coupled to a second bus. In other embodiments, more than two busses are utilized.

The device 100 also may include a graphics processor 144 coupled to the display 116 and to the CPU 104. The graphics processor 144 may be coupled to the display 116 via the I/O processor 112. The graphics processor 144 may be coupled to the CPU 104 and the I/O processor 112 via one or more busses 140.

The device 100 is only one example of a computing device 100, and other suitable devices can have more or fewer components than shown, can combine two or more components, or a can have a different configuration or arrangement of the components. The various components shown in FIG. 1 can be implemented in hardware, one or more processors executing software or firmware instructions or a combination of both i) hardware and ii) one or more processors executing software or firmware instructions, including one or more integrated circuits (e.g., an application specific integrated circuit (ASIC)).

The CPU 104 executes computer readable instructions stored in the memory 108. The I/O processor 112 interfaces the CPU 104 with input and/or output devices, such as the display 116, the touch screen 120, and other input/control devices 124. Similarly, the graphics processor 144 executes computer readable instructions stored in the memory 108 or another memory (not shown) associated with the graphics processor 144. The I/O processor 112 interfaces the graphics processor 144 with the display 116 and, optionally other input/control devices.

The I/O processor 112 can include a display controller (not shown) and a touchscreen controller (not shown). The touchscreen 120 includes one or more of a touch-sensitive surface and a sensor or set of sensors that accepts input from the user based on haptic and/or tactile contact. The touchscreen 120 utilizes one or more of currently known or later developed touch sensing technologies, including one or more of capacitive, resistive, infrared, and surface acoustic wave technologies, as well as other proximity sensor arrays or other elements for determining one or more points of contact with the touchscreen 120. The touchscreen 120 and the I/O processor 112 (along with any associated modules and/or sets of instructions stored in memory 102 and executed by the CPU 104) can detect one or more points of or instances of contact (and any movement or breaking of the contact(s)) on the touchscreen 120, in some embodiments. Such detected contact can be converted by the CPU 104 into interaction with a user-interface mechanism that is displayed on the display 116. A user can make contact with the touchscreen 120 using any suitable object or appendage, such as a stylus, a finger, etc. In some embodiments, the touchscreen 120 includes force sensors that measure an amount of force applied by a touch. In such embodiments, an amount of force applied in connection with a contact can be utilized to distinguish between different user-requested actions. For example, a contact made with a relatively light touch may correspond to a first requested action (e.g., select an object), whereas a relatively forceful touch may correspond to a second requested action (e.g., select an object and open pop-up menu associated with the selected object).

The network interface 128 facilitates communication with a wireless communication network such as a mobile communications network, a wireless local area network (WLAN), a wide area network (WAN), a personal area network (PAN), etc., via the one or more antennas 132. In other embodiments, one or more different and/or additional network interfaces facilitate wired communication with one or more of a local area network (LAN), a WAN, another computing device such as a personal computer, a server, etc.

Software components or modules (i.e., sets of computer readable instructions executable by the CPU 104) are stored in the memory 108 and/or a separate memory (not shown) associated with the graphics processor. The software components can include an operating system, a communication module, a contact module, a graphics module, and applications such as a computational application, a data processing application, a software code editor, etc. The operating system can include various software components and/or drivers for controlling and managing general system tasks (e.g., memory management, etc.) and can facilitate communication between various hardware and software components. The communication module can facilitate communication with other devices via the network interface 128.

The contact module can detect contact with the touchscreen 120 (in conjunction with the I/O processor 112). The contact module can include various software components for performing various operations related to detection of contact, such as determining if contact has occurred, determining if there is movement of the contact and tracking the movement across the touchscreen 120 (in some embodiments), determining an amount of force in connection with the contact (in some embodiments), and determining if the contact has been broken (i.e., if the contact has ceased). Determining movement of the point of contact can include determining speed (magnitude), velocity (magnitude and direction), and/or an acceleration (a change in magnitude and/or direction) of the point of contact. These operations can be applied to single contacts (e.g., one finger contacts) or to multiple simultaneous contacts (e.g., "multi-touch"/ multiple finger contacts), in some embodiments.

The graphics module can include various suitable software components for rendering and displaying graphics objects on the display 116. As used herein, the term "graphics" includes any object that can be displayed to a user, including without limitation text, web pages, icons, symbols, digital images, etc.

An input grammar generation module 148 includes machine readable instructions that, when executed by one or more processors (such as the CPU 104 and/or the graphics processor 144), cause a system including the one or more processors to (i) receive, as input, a learnt distribution model, a probability of fuzzing a character, and a threshold probability for modifying predicted characters; (ii) sample the learnt distribution model to generate a candidate next character in a sequence and a probability of the candidate next character being an actual next character in the sequence; and (iii) in response to determining that the probability of the candidate next character being the actual next character in the sequence is greater than the threshold probability for modifying predicted characters, sample the learnt distribution model to generate a new candidate next character in the sequence, in an embodiment.

In embodiments in which the CPU 104 executes at least portions of the input grammar generation module 148, the input grammar generation module 148 may be stored in the memory 108. In embodiments in which the graphics processor 144 executes at least portions of the input grammar generation module 148, the input grammar generation module 148 may be stored in the memory 108 and/or in another memory (not shown) of or coupled to the graphics processor 144. In some embodiments, the memory 108 is coupled to the graphics processor 144.

An application module 152, stored in the memory 108, may, when executed by the CPU 104, interact with the input grammar generation module 148. For example, in embodiments in which the application module 152 is an application for finding security vulnerabilities in input-parsing code, the application module 152 may utilize the input grammar generation module 148 to generate input grammars that can be used for grammar-based fuzzing. As another example, in embodiments in which the application module 152 is an application for finding security vulnerabilities in input-parsing code, the application module 152 may utilize the input grammar generation module 148 to perform neural-network based learning of a generative model of complex structured inputs. As yet another example, in embodiments in which the application module 152 is an application for finding security vulnerabilities in input-parsing code, the application module 152 may utilize the input grammar generation module 148 to generate fuzzing inputs using a process that incorporates additional noise from the learnt input model.

Each of the above identified modules and applications can correspond to a set of instructions that, when executed by one or more processors, cause one or more functions described above to be performed. These modules need not be implemented as separate software programs, procedures or modules, and thus various subsets of these modules can be combined or otherwise re-arranged in various embodiments. For example, in some embodiments, the input grammar generation module 148 is a component of the application module 152. In some embodiments, the memory 108 (and separate memory associated with the graphics processor, when included) stores a subset of the modules and data structures identified above. In other embodiments, the memory 108 (and separate memory associated with the graphics processor, when included) stores additional modules and data structures not described above.

In various examples and embodiments described below, computer memories and processors are described with reference to the device 100 of FIG. 1 for ease of explanation. In other embodiments, another suitable device different than the device 100 is utilized for processing and/or storage. For example, other suitable devices include desktop computers, laptop computers, tablet computers, a smart phone, servers, computer gaming systems, cable television set top boxes, televisions, etc. Such other suitable devices may have a basic structure similar to the device 100 of FIG. 1.

Figure 2:
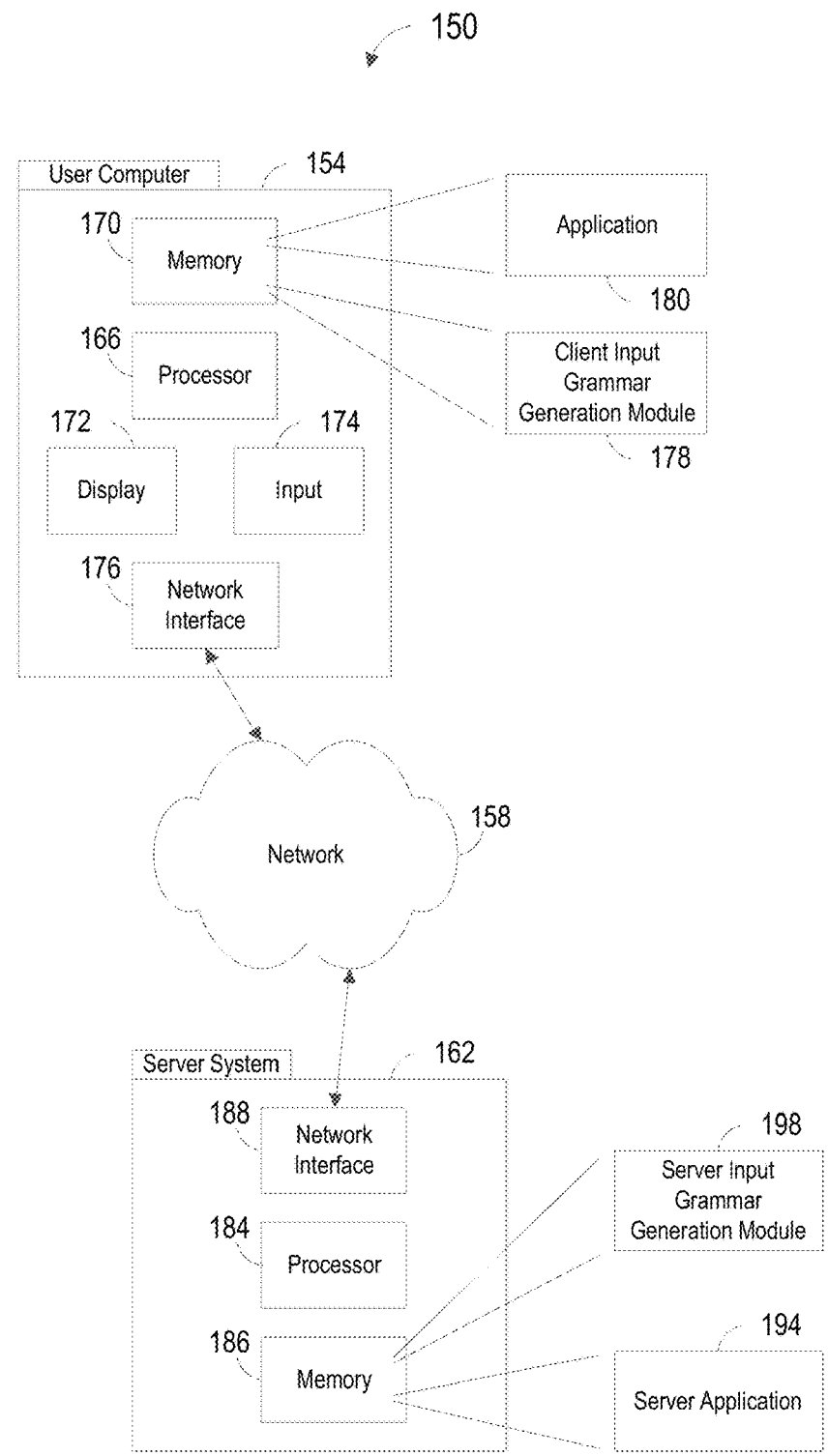
FIG. 2 is a block diagram of an example system configured to implement input grammar generation techniques described herein, according to one or more embodiments.

FIG. 2 is a diagram of an example system 150 which may implement an input grammar generation module configured to automatically generate an input grammar suitable for input fuzzing using sample inputs and neural-network-based statistical machine-learning techniques, according to some embodiments.

A user computer 154 is configured to implement an input grammar generation module alone, in one embodiment, or in conjunction with a server system 162, in another embodiment. In embodiments that include the server system 162, the user computer 154 is communicatively coupled to a communication network 158 including, for example, one or more of the Internet, an intranet, an extranet, a mobile communications network, etc., and the server system 162 is also communicatively coupled to the network 158. In embodiments that include the server system 162, the user computer 154 is configured to communicate with the server system 162 via the network 158.

The user computer 154 may be (or include) a computing device such as a desktop computer, a laptop computer, a tablet computer, a smart phone, a computer gaming system, a cable television set top box, etc. The user computer 154 may include one or more processors 166 (e.g., one or more CPUs, one or more coprocessors, and/or a graphics processor), one more memory devices 170 (e.g., random access memory (RAM), read only memory (ROM), FLASH memory, a magnetic disk, an optical disk, etc.), one or more display devices 172 (e.g., integral display device and/or external display device), and one or more input devices 174, such as a keyboard, a keypad, a button, a mouse, a trackball, a touch screen, a multi-touch screen, a touch pad, etc. The user computer 154 may include a network interface 176 to communicatively couple the user computer 154 to the network 158. At least some of the one or more processors 166 (hereinafter referred to as "the processor 166" for purposes of brevity), the one or more memory devices 170 (hereinafter referred to as "the memory device 170" for purposes of brevity), the one or more display devices 172 (hereinafter referred to as "the display device 172" for purposes of brevity), the one or more input devices 174 (hereinafter referred to as "the input device 174" for purposes of brevity), and the network interface 176 may be communicatively coupled together via one or more busses (not shown), cords (not shown), etc. In embodiments in which the user computer 154 comprises a set top box or a gaming system, for example, the display 172 may comprise a television communicatively coupled to the set top box or the gaming system.

The memory device 170 may store all or a portion of a client input grammar generation module 178. The client input grammar generation module 178, when executed by the processor 166, may cause the processor 166 to (i) receive, as input, a learnt distribution model, a probability of fuzzing a character, and a threshold probability for modifying predicted characters; (ii) sample the learnt distribution model to generate a candidate next character in a sequence and a probability of the candidate next character being an actual next character in the sequence; and (iii) in response to determining that the probability of the candidate next character being the actual next character in the sequence is greater than the threshold probability for modifying predicted characters, sample the learnt distribution model to generate a new candidate next character in the sequence, in an embodiment. As will be discussed in greater detail below, the client input grammar generation module 178 may generate inputs for grammar-based fuzzing using information (e.g., sample inputs) received from the server system 162, in some embodiments in which the server system 162 is included.

An application module 180, stored in the memory 170, may, when executed by the processor 166, interact with the client input grammar generation module 178. For example, in embodiments in which the application module 180 is an application for finding security vulnerabilities in input-parsing code, the application module 180 may utilize the client input grammar generation module 178 to generate input grammars that can be used for grammar-based fuzzing. As another example, in embodiments in which the application module 180 is an application for finding security vulnerabilities in input-parsing code, the application module 180 may utilize the client input grammar generation module 178 to perform neural-network based learning of a generative model of complex structured inputs. As yet another example, in embodiments in which the application module 180 is an application for finding security vulnerabilities in input-parsing code, the application module 180 may utilize the client input grammar generation module 178 to generate fuzzing inputs using a process that incorporates additional noise from the learnt input model.

In an embodiment, the application 180 may comprise a front end system that interfaces with a kernel implemented by the server system 162. In this embodiment, the front end system implemented by the user computer 154 may receive user input corresponding to functions commands, instructions, etc., and forward the user input to the server system 162. The kernel implemented on the server system 162 may then execute or interpret the entered functions, commands, instructions, etc., and perform corresponding numerical and/or symbolic calculations to generate corresponding results. The server system 162 may then transmit the results to the user computer 154, and the front end system implemented by the user computer 154 may then perform one or more operations using the results (e.g., store the results in memory 170, utilize the results to generate a graphical user interface on the display 172, and the like).

More generally, in some embodiments, the application 180 may comprise a client-side module that interfaces with a server-side module implemented by the server system 162. In some embodiments, the application 180 is an intranet or secure web portal. For instance, in one embodiment, the server system 162 may implement a grammar-based fuzzing application, and a user may utilize the grammar-based fuzzing application by way of an intranet or secure web portal 180 implemented by the user computer 154. In this embodiment, the user computer 154 may receive user input corresponding to functions commands, instructions, etc. entered by the user by way of a web page that includes one or more user interface mechanisms for entering sample inputs to be used in performing neural-network based learning of a generative model of complex structured inputs.

Input entered by the user is forwarded to the server system 162. The grammar-based fuzzing application implemented on the server system 162 may then execute or interpret the entered functions, commands, instructions, etc., and perform corresponding numerical and/or symbolic calculations, or various lookup operations, to generate corresponding results. The server system 162 may then generate a web page to display the results, in an embodiment. In other embodiments, the server system 162 may generate the results in a different format or electronic medium. The results are transmitted by the server system 162 to the user computer 154. In some embodiments, the results are transmitted by the server system 162 to the user computer 154 as a web page, for example. A web browser, intranet, or secure portal implemented by the user computer 154 may then display the results.

The server system 162 may comprise one or more computing devices such as a desktop computer, a server, a mainframe, etc. The server system 162 may include one or more processors 184 (hereinafter referred to as "the processor 184" for purpose of brevity), one more memory devices 186 (e.g., RAM, ROM, FLASH memory, a magnetic disk, an optical disk, a database system, etc.) (hereinafter referred to as "the memory device 186" for purpose of brevity), and a network interface 188 to communicatively couple the server system 162 to the network 158. At least some of the processor 184, the memory device 186, and the network interface 188 may be communicatively coupled together via one or more of 1) one or more busses, 2) one or more networks (e.g., a local area network (LAN), a wide area network (WAN), etc.) 3) point-to-point communication links, 4) cords, etc. (not shown).

The memory device 186 may store a server application 194 that is executed by the processor 184. The server application 194 may comprise a web server application, a grammar-based fuzzing application, etc., in various embodiments.

In an embodiment, the server application 194 comprises a grammar-based fuzzing application that, when executed by the processor 184, may perform various numerical, graphical, and/or symbolic calculations corresponding to functions, commands, instructions, etc., entered by the user in connection with finding security vulnerabilities in input-parsing code. For example, the server application 194 may execute or interpret the functions, commands, instructions, etc., received from the user computer 154, and perform corresponding numerical and/or symbolic calculations, or corresponding lookup operations, to generate corresponding results. In embodiments in which the server system 162 implements a kernel of a grammar-based fuzzing application, the server application 194 may cause the server system 162 to transmit the results to the user computer 154 via the network 158. In embodiments in which the server system 162 implements a full grammar-based fuzzing application 194, in which the grammar-based fuzzing application 194 may generate modified or "fuzzed" inputs for use in repeatedly testing a code parser, etc., that includes the results as a web page, for example, and may cause the server system 162 to transmit the web page to the user computer 154 via the network 158.

The memory device 186 may store a server input grammar generation module 198 that is executed by the processor 184. The server input grammar generation module 198 may provide information for use by the client input grammar generation module 178 in generating grammar inputs for grammar-based fuzzing techniques described above. For example, information generated by the server input grammar generation module 197 may be transmitted by the server system 162 to the user computer 154. For example, the server input grammar generation module 198 may provide information that, when utilized by the client input grammar generation module 178, allows the client input grammar generation module 178 to generate grammar inputs for grammar-based fuzzing, in some embodiments. In some embodiments, the client input grammar generation module 178 is omitted and the server input grammar generation module 198 performs the input grammar generation and fuzzing operations directly, for example.

In view of the deficiencies associated with existing approaches for grammar-based fuzzing, the methods and systems of the present disclosure provide neural-network based learning of a generative model of complex structured inputs, in accordance with one or more embodiments. In some embodiments, the methods and systems provide fuzzing inputs using a process (e.g., computational process or algorithm) that incorporates additional noise from the learnt input model.

As will be described in greater detail below, the present disclosure provides methods and systems for generating input grammars for grammar-based fuzzing by utilizing machine-learning techniques and sample inputs. In some embodiments, neural-network-based statistical learning techniques are used for the automatic generation of input grammars. For example, in some embodiments, recurrent neural networks are used for learning a statistical input model that is also generative: the model can be used to generate new inputs based on the probability distribution of the learnt model. According to an embodiment, unsupervised learning is used, and the method is fully automatic and does not require any format-specific customization.

The present disclosure also describes a new computational process (e.g., algorithm) that uses a learnt input probability distribution to intelligently guide where to fuzz (e.g., statistically well-formed) inputs, according to an embodiment. This computational process is designed to outperform other learning-based and random fuzzing techniques described herein.

Further details regarding the methods and systems will be provided in the sections that follow, which cover, for example, the following:

(i) An overview of the PDF format.

(ii) Using and adapting neural-network-based learning to address the problem of how to learn and then generate diverse, well-formed inputs to maximize parser-code coverage, while still injecting enough ill-formed input parts to exercise unexpected code paths and error-handling code.

(iii) Results are presented on the evaluation of the methods and systems with respect to a large complex security-critical parser for PDF format.

PDF Document Structure

To assist with understanding the methods and systems described herein, the following provides an overview of the structure of PDF documents.

The full specification of the PDF format is extremely lengthy (over 1,300 pages). A large portion of the specification (approximately 70%) deals with the description of data objects and their relationships between parts of a PDF document. PDF files are encoded in a textual format, which may contain binary information streams (e.g., images, encrypted data, etc.). A PDF document is a sequence of at least one PDF body, and a PDF body is composed of three sections: objects, cross-reference table, and trailer.

FIG. 3 illustrates excerpts 300 of a well-formed PDF document, including a sample object 310, a cross-reference table 315 with one subsection, and a trailer 320.

Objects. The data and metadata in a PDF document are organized in basic units called "objects." As shown in sample object 310, objects are all similarly formatted and have a joint outer structure. The first line of the object 310 is its identifier, for indirect references, its generation number (e.g., "2 0" in the sample object 310), which is incremented if the object is overridden with a newer version, and "obj", which indicates the start of an object. The "endobj" indicator closes the object. The object 310 contains a dictionary structure, which is delimited by "<<" and ">>", and contains keys that begin with "/" followed by their values. "[3 0 R]" is a cross-object reference to an object in the same document with the identifier "3" and the generation number "0". Since a document can be very large, a referenced object is accessed using random-access via a cross-reference table (e.g., cross-reference table 315).

FIG. 4 illustrates other examples 400 of PDF data objects of different types. Object 410 has the content [680.6 680.6], which is an array object. The purpose of an array object 410 is to hold coordinates referenced by another object. Object 415 is a string literal that holds the bookmark text for a PDF document section. Object 420 is a numeric object, and object 425 is an object containing a multi-type array. The objects 400 shown in FIG. 4 are all examples of object types that are both used on their own and as the basic blocks from which other objects are composed. For example, the dictionary object 310 shown in FIG. 3 contains an array. A majority of the PDF-format specification is dedicated to the rules for defining and composing objects.

Cross-Reference Table. The cross-reference tables of a PDF body contain the address in bytes of referenced objects within the document. The cross-reference table 315 shown in FIG. 3 includes a subsection that contains the addresses for five objects with identifiers "1-5" and the placeholder for identifier "0", which never refers to an object. The object being pointed to is determined by the row of the table 315 (the subsection will include six objects starting with identifier "0"), where "n" is an indicator for an object in use, where the first column is the address of the object in the file, and "f" is an object not used, where the first column refers to the identifier of the previous free object, or in the case of object 0 to object 65535, the last available object ID, closing the circle.

Trailer. The trailer of a PDF body (e.g., trailer 320 in FIG. 3) contains a dictionary (again contained within "<<" and ">>") of information about the body, and "startxref", which is the address of the cross-reference table (e.g., cross-reference table 315). This allows the body to be parsed from the end, reading "startxref", then skipping back to the cross-reference table 315 and parsing it, and only parsing objects as they are needed.

PDF documents can be updated incrementally. This means, for example, that if a PDF writer wishes to update the data in object "12", the PDF writer will start a new PDF body, write the new object with identifier "12" in the new PDF body, and also include a generation number greater than the one that appeared before (e.g., greater than the generation number immediately preceding). The writer will then write a new cross-reference table pointing to the new object, and append this body to the previous document. Similarly, an object can be deleted by creating a new cross-reference table and marking it as free. As will be described in greater detail below, in some embodiments such an approach is used to append new objects in a PDF file.

In accordance with one or more embodiments, the methods and systems described herein are designed to leverage and adapt neural-network-based learning techniques to learn a grammar for non-binary PDF data objects. Such data objects are formatted text, such as sample object 310 shown in FIG. 3 and the additional example objects 400 shown in FIG. 4. The rules for defining and composing such data objects which, as discussed above, constitutes the bulk of the PDF-format specification, are numerous and tedious, but repetitive and structured. As such, the rules for defining and composing data objects are well-suited for learning with neural networks (as described in greater detail below). On the other hand, learning automatically the structure (rules) for defining cross-reference tables and trailers (e.g., cross-reference table 315 and trailer 320 in FIG. 3), which involve constraints on lists, addresses, pointers, and counters, is significantly more complex. Therefore, the present disclosure does not address in detail learning the rules for defining cross-reference tables and trailers with neural networks. It should also be noted that the present disclosure does not consider binary data objects, which are encoded in binary (e.g., image) sub-formats and for which fully-automatic blackbox and whitebox fuzzing techniques are already effective.

Statistical Learning of Object Contents

The following describes a statistical learning approach for learning a generative model of PDF objects, in accordance with one or more embodiments of the present disclosure.

One of the underlying aims of the methods and systems described herein is to learn a generative language model over the set of PDF object characters given a large corpus of objects. In some embodiments, a sequence-to-sequence (sometimes referred to herein as "seq2seq") network model is used, where the seq2seq model has been shown to produce state-of-the-art results for many different learning tasks such as, for example, machine translation, speech recognition, etc. The seq2seq model allows for learning arbitrary length contexts to predict next sequence of characters as compared to traditional n-gram based approaches that are limited by contexts of finite length. In at least one embodiment, given a corpus of PDF objects, the seq2seq model can be trained in an unsupervised manner to learn a generative model to generate new PDF objects using a set of input and output sequences. The input sequences correspond to sequences of characters in PDF objects and the corresponding output sequences are obtained by shifting the input sequences by one position. The learnt model can then be used to generate new sequences (e.g., PDF objects) by sampling the distribution given a starting prefix (such as "obj"), according to an embodiment.

Sequence-to-Sequence Neural Network Models

A recurrent neural network (RNN) is a neural network that operates on a variable length input sequence $\langle x_1, x_2, \ldots, x_{t-1} \rangle$ and consists of a hidden state h and an output y. The RNN processes the input sequence in a series of time stamps (e.g., one for each element in the sequence). For a given time stamp, t, the hidden state, $h_t$ at that time stamp and the output $y_t$ may be computed as:

$$h_t = f(h_{t-1}, x_t)$$

$$y_t = \phi(h_t)$$

where f is a non-linear activation function such as sigmoid, tanhh, etc., and $\phi$ is a function such as "softmax" that computes the output probability distribution over a given vocabulary conditioned on the current hidden state. RNNs can learn a probability distribution over a character sequence $\langle (x_1, x_2, \ldots x_{t-1} \rangle$ by training to predict the next character $x_t$ in the sequence. In other words, with respect to the present example, RNNs can learn the conditional distribution $p(x_t | \langle x_1, \ldots, x_{t-1} \rangle)$.

An existing technique introduced a sequence-to-sequence (seq2seq) model that consists of two recurrent neural networks, an encoder RNN that processes a variable dimensional input sequence to a fixed dimensional representation, and a decoder RNN that takes the fixed dimensional input sequence representation and generates the variable dimensional output sequence. The decoder network generates output sequences by using the predicted output character generated at time step t as the input character for time step t+1.

Figure 5:
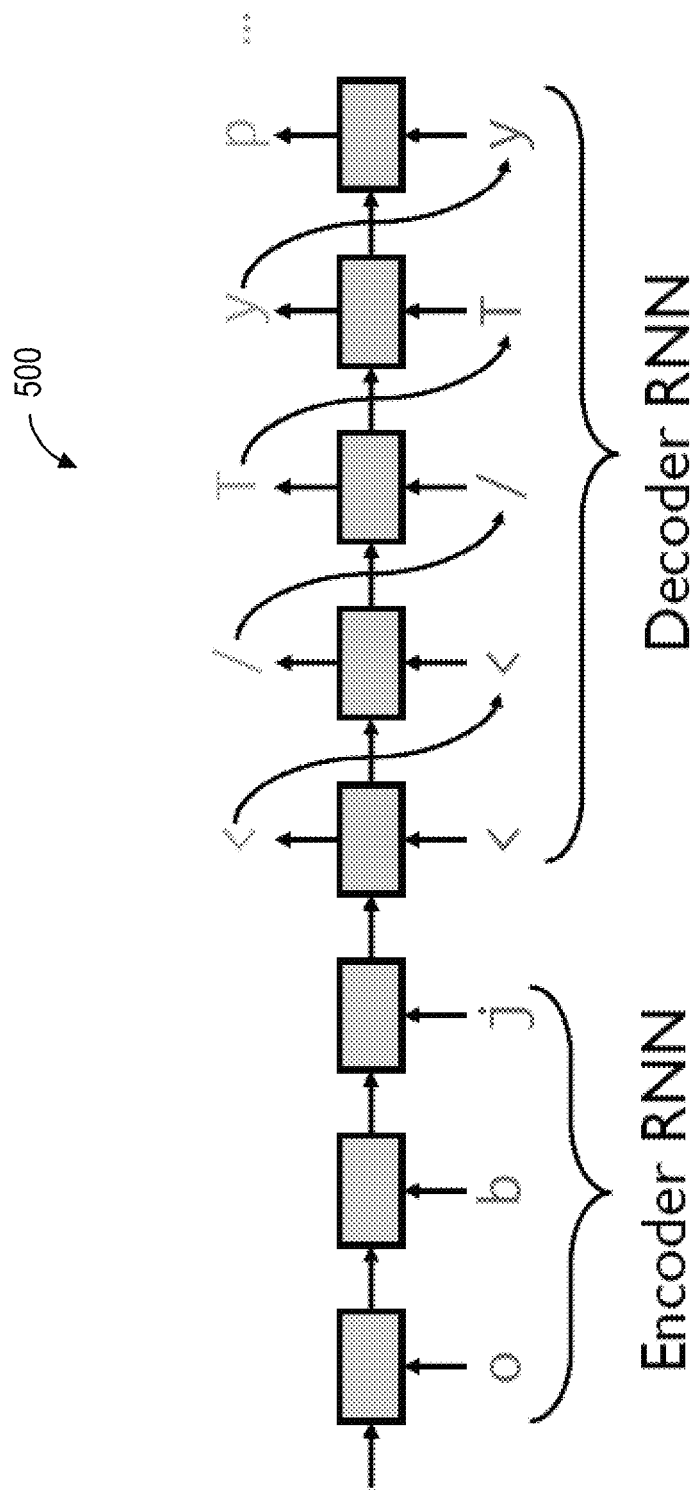
FIG. 5 is a block diagram illustrating an example architecture of a sequence-to-sequence recurrent neural network (RNN) model to generate PDF objects, according to one or more embodiments described herein.

FIG. 5 illustrates an example architecture of a sequence-to-sequence RNN model 500 to generate PDF objects, in accordance with one or more embodiments. The seq2seq architecture 500 allows for learning a conditional distribution over a sequence of next outputs, that is, $p(\langle y_1, \ldots, y_{T_1} \rangle | \langle x_1, \ldots, x_{T_2} \rangle)$.

In an embodiment, the seq2seq model (e.g., seq2seq model 500 shown in FIG. 5) is trained using a corpus of PDF objects, treating each one as a sequence of characters. The training process may include, for example, first concatenating all of the object files $s_i$ into a single file resulting in a large sequence of characters $\tilde{s} = s_1 + \ldots + s_n$. Then the sequence may be split into multiple training sequences of a fixed size d, such that the $i^{th}$ training instance $t_i = \tilde{s}[i*d:(i+1)*d]$, where s[k:l] denotes the subsequence of s between indices k and l. The output sequence for each training sequence is the input sequence shifted by one position. In the present example, the output sequence would be $o_i = \tilde{s}[i*d+1:(i+1)*d+1]$. The seq2seq model is then trained end-to-end to learn a generative model over the set of all training instances, in an embodiment.

Generating New PDF Objects

The learnt seq2seq model may be used to generate new PDF objects, according to some embodiments. There are several different strategies for object generation depending upon the sampling strategy used to sample the learnt distribution. In at least one embodiment, the approach always starts with a prefix of the sequence "obj" (denoting the start of an object instance), and then queries the model to generate a sequence of output characters until it produces "endobj" corresponding to the end of the object instance.

The following describes three different example sampling strategies that may be utilized for generating new object instances. In some embodiments, one or more of these example sampling techniques may be utilized. It should be noted that the names given to the sampling techniques below are entirely illustrative and are referred to merely for purposes of brevity. As such, it should be understood that the example sampling techniques may be referred to in numerous other ways in addition to or instead of the example names used below.

NoSample: In this first technique for generating new object instances, the learnt distribution is used to greedily predict the best character given a prefix. This strategy results in generating PDF objects that are most likely to be well-formed and consistent; however, the strategy also limits the number of objects that can be generated. Given a prefix like "obj", the best sequence of next characters is uniquely determined, and therefore this approach results in the same PDF object. Such a limitation makes this strategy less useful for fuzzing.

Sample: In this generation strategy, the learnt distribution is used to sample next characters (e.g., instead of selecting the top predicted character) in the sequence given a prefix sequence. This sampling strategy is able to generate a diverse set of new PDF objects by combining various patterns the model has learnt from the diverse set of objects in the training corpus. Because of sampling, the generated PDF objects are not always guaranteed to be well-formed, which is useful from the fuzzing perspective.

SampleSpace: This generation strategy is a combination of the "Sample" and "NoSample" strategies described above. In accordance with at least one embodiment, the "SampleSpace" technique samples the distribution to generate the next character only when the current prefix sequence ends with a whitespace, whereas it uses the best character from the distribution in middle of tokens (e.g., prefixes ending with non-whitespace characters), similar to the NoSample strategy. As compared to the Sample strategy, SampleSpace generates more well-formed PDF objects as the sampling is restricted to only at the end of whitespace characters.

SampleFuzz: Sampling with Fuzzing

In some embodiments, the learning of a generative model of PDF objects is used to perform fuzzing. In practice, a perfect learning technique would always generate well-formed objects that would not exercise any error-handling code, whereas a poor learning technique would result in ill-formed objects that would be quickly rejected by the parser upfront. Considering this tradeoff, the present disclosure provides a new process (e.g., method, computational process, etc.) for performing fuzzing while sampling new objects. In the description that follows, this process is sometimes referred to as "SampleFuzz." As will be described in greater detail below, SampleFuzz uses the learnt model to generate new PDF object instances, while at the same time introducing anomalies to exercise error-handling code, according to some embodiments.

FIG. 6 is an example process 600 for performing fuzzing while sampling new objects, according to one or more embodiments. The process 600 uses the learnt generative model to generate new PDF object instances, and at the same time introduces anomalies in order to exercise error-handling code.

In an embodiment, the process 600 takes as input the learnt distribution $D(x, \theta)$ 610, the probability of fuzzing a character $t_{fuzz}$ 620, and a threshold probability $p_t$ 630 that is used to determine whether to modify the predicted character. While generating the output sequence "seq", the process 600 samples the learnt model to get some next character c and its probability p(c) at a particular timestamp t. If the probability p(c) is higher than the user-provided threshold probability $p_t$ (e.g., if the model is confident that c is likely the next character in the sequence), the process 600 determines to instead sample another different character c' in its place, where c' has the minimum probability p(c') in the learnt distribution. It should be noted that, in at least one embodiment, this modification (e.g., fuzzing) is performed only if the result $p_{fuzz}$ of a random coin toss returns a probability higher than input parameter $t_{fuzz}$, which allows the user to further control the probability of fuzzing characters.

One of the key intuitive features of the process 600 is to introduce unexpected characters in objects only in places where the model is highly confident, in order to trick the PDF parser. The process 600 also ensures that the object length is bounded by "MAXLEN". It should be noted that while in some embodiments the process 600 is not guaranteed to always terminate, the process 600 does always terminate in practice.

Training the Model

Since the seq2seq model is trained in an unsupervised learning setting, there are no test labels to explicitly determine how well the learnt models are performing. Instead, the approach includes training multiple models parameterized by number of passes, called epochs, which the learning process performs over the training dataset. An epoch is thus defined as an iteration of the learning process to go over the complete training dataset. As will be described in greater detail below, the evaluation process includes evaluating the seq2seq models trained for five different numbers of epochs: 10, 20, 30, 40, and 50. In the present example setting, one epoch takes approximately twelve minutes to train the seq2seq model, and the model with 50 epochs takes approximately ten hours to learn. A long short-term memory (LSTM) model (a variant of RNN) is used with two hidden layers, where each layer consists of 128 hidden states.

Description of Example Evaluation

To further aid in understanding the various objects and features of the methods and systems of the present disclosure, the following describes an example evaluation of the methods and systems for a very complex input format, namely, PDF, and a large complex security-critical parser for this format (e.g., a PDF parser embedded in a recently released web browser).

Evaluation Setup

The following presents sample results of various fuzzing experiments with the PDF viewer included in a recently released web browser. The evaluation used a self-contained single-process test-driver executable provided for testing/fuzzing purposes. This executable takes a PDF file as input argument, executes the PDF parser included in the web browser, and then stops. If the executable detects any parsing error due to the PDF input file being malformed, it prints an error message in an execution log. In the following, the executable is referred to simply as the "PDF parser" for purposes of brevity. The evaluation experiments were performed on 4-core 64-bit Windows 10 VMs with 20 Gb of RAM.

Three main standard metrics were used to measure fuzzing effectiveness:

(i) Coverage. For each test execution, instruction coverage is measured, where instruction coverage refers to the set of all unique instructions executed during that test. Each instruction is uniquely identified by a pair of values "dll-name" and "dll-offset". The coverage for a set of tests is simply the union of the coverage sets of each individual test.

(ii) Pass Rate. For each test execution, a programmatic check (grep) is performed for the presence of parsing-error messages in the PDF-parser execution log. If there are no error messages, the test is identified as "pass," otherwise it is identified as "fail." Pass tests corresponds to PDF files that are considered to be well-formed by the PDF parser. This metric is less important for fuzzing purposes, but it helps for estimating the quality of the learning.

(iii) Bugs. Each test execution is performed under a runtime monitoring tool that can catch memory corruptions bugs (e.g., buffer overflows) with a low runtime overhead (typically a few percent runtime overhead) and that is widely used for fuzzing.

Training Data

For the training data used in connection with the evaluation, approximately 63,000 non-binary PDF objects were extracted out of a diverse set of 534 PDF files. These 534 files themselves had been used for prior extended fuzzing of the particular PDF parser. This set of 534 files was itself the result of seed minimization, that is, the process of computing a subset of a larger set of input files that provides the same instruction coverage as the larger set. Seed minimization is a standard first step applied before file fuzzing. The larger set of PDF files came from various sources, such as, for example, past PDF files used for fuzzing, other PDF files collected from the public web, etc.

These 63,000 non-binary objects formed the training set for the RNNs used in connection with one or more embodiments of the present disclosure. As discussed above, binary objects embedded in PDF files (typically representing images in various image formats) were not considered.

Although the methods and systems of the present disclosure learn, generate, and fuzz PDF objects, the PDF parser used in the evaluation is designed to process full PDF files, not single objects. As such, a simple program was created to correctly append a new PDF object to an existing (well-formed) PDF file, which is referred to herein as a "host," following the procedure described above for updating a PDF document. Specifically, the program first identifies the last trailer in the PDF host file. This provides information about the file, such as addresses of objects and the cross-reference table, and the last used object ID. Next, a new body section is added to the file. In it, the new object is included with an object ID that overrides the last object in the host file. A new cross reference table is appended, which increases the generation number of the overridden object. Lastly, a new trailer is appended.

Baseline Coverage

To allow for a meaningful interpretation of coverage results, 1,000 PDF objects were randomly selected out of the 63,000 training objects, and for these selected objects their coverage of the PDF parser was measured, to be used as a baseline for later experiments.

A first question addressed in the evaluation was which host PDF file should be used: since any PDF file will have some objects in it, a determination needed to be made as to whether a new appended object would interfere with other objects already present in the host, and hence influence the overall coverage and pass rate.

To study this question, the smallest three PDF files in the set of 534 files were selected and used as hosts. These three hosts were of size 26 Kb, 33 Kb, and 16 Kb respectively.

Figure 7:
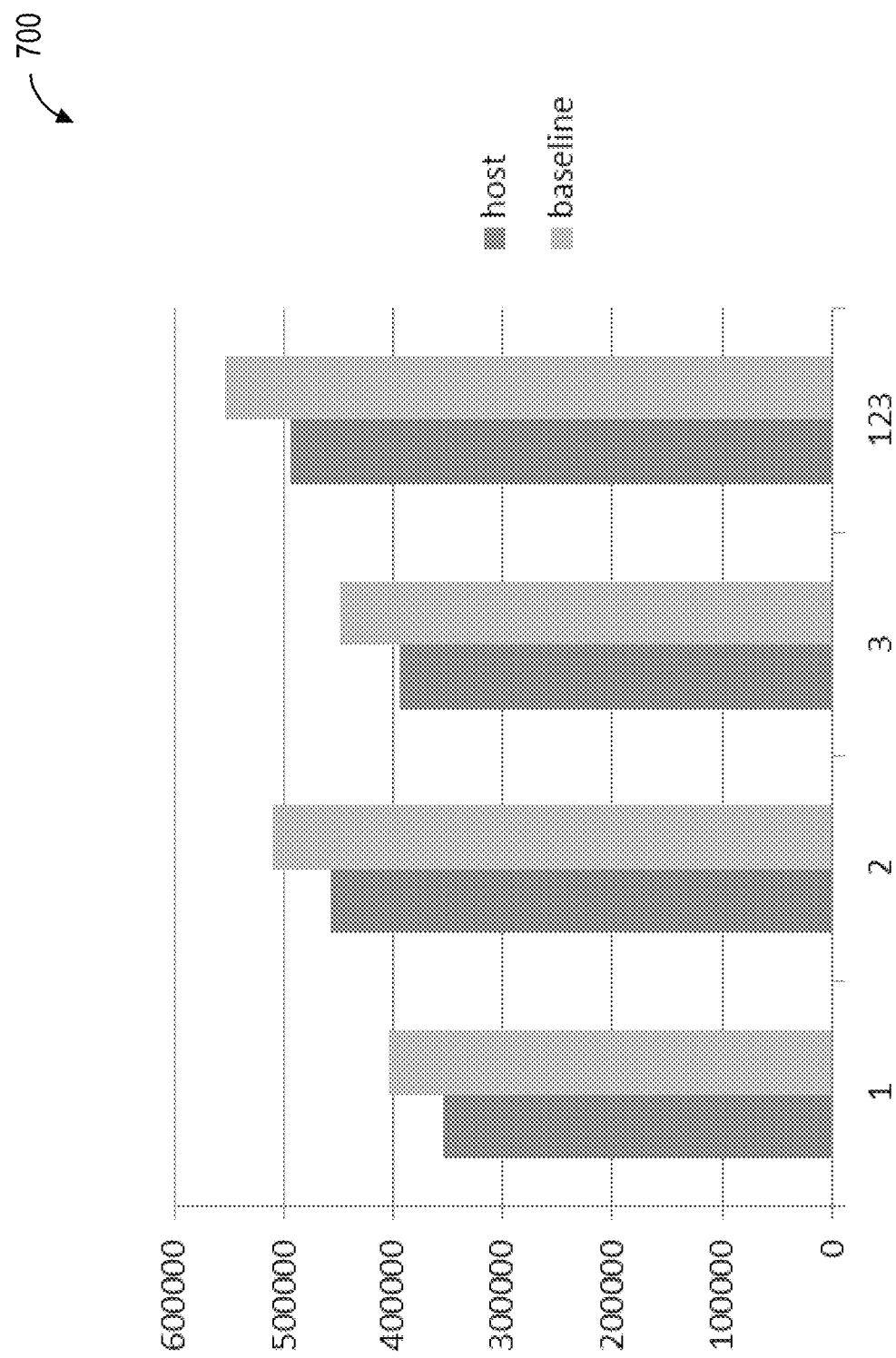
FIG. 7 is a graphical representation illustrating example instruction coverages for PDF hosts and baselines, according to one or more embodiments described herein.

FIG. 7 is a graphical representation 700 that illustrates instruction coverage for PDF hosts and baselines. Graphical representation 700 shows the instruction coverage obtained by running the PDF parser on the three hosts, denoted "host1," "host2," and "host3." The graphical representation 700 also shows the coverage obtained by computing the union of these three sets, denoted "host123." Coverage ranges from 353,327 (for host1) to 457,464 (for host2) unique instructions, while the union (for host123) is 494, 652, and larger than all three. It should be noted that each host covers some unique instructions not covered by the other two. It should also be noted that the smallest file, host3, does not lead to the smallest coverage.

Each of the 1,000 baseline objects were also recombined with each of the three hosts, to obtain three sets of 1,000 new PDF files, denoted "baseline1," "baseline2," and "baseline3," respectively. The graphical representation 700 shows the coverage of each baseline set, as well as their union, denoted "baseline123." The following should be noted with respect to the results shown in graphical representation 700:

(i) The baseline coverage varies depending on the host, but is larger than the host alone (which was as expected). The largest difference between a host and a baseline coverage is 59,221 instructions for host123 out of 553,873 instructions for baseline123. In other words, 90% of all instructions are included in the host coverage no matter what new objects are appended.

(ii) Each test typically covers on the order of half a million unique instructions.

This confirms that the PDF parser is a large and non-trivial application.

(iii) 1,000 PDF files take about 90 minutes to be processed (both to be tested and get the coverage data).

In addition, the pass rate was also measured for each experiment. As expected, the pass rate was 100% for all three of the hosts.

In view of the above, it should be understood that even though coverage varies across hosts because objects may interact differently with each host, the re-combined PDF file is always perceived as well-formed by the PDF parser.

Learning PDF Objects

When training the RNN, an important parameter is the number of epochs being used (as described above). The results presented herein are of experimental evaluations obtained after training the RNN for 10, 20, 30, 40, and 50 epochs, respectively. After training, each learnt RNN model was used to generate 1,000 unique PDF objects. The generated objects were also compared with the 63,000 objects used for training the model, and no exact matches were found.

As described above, two main RNN generation strategies (e.g., modes, techniques, methods, etc.) may be utilized in accordance with one or more embodiments of the present disclosure. The first is the Sample mode/strategy, where the distribution is sampled at every character position. The second is the SampleSpace mode/strategy, where the distribution is sampled only after whitespaces, and the top predicted character is generated for other positions.

Figure 8:
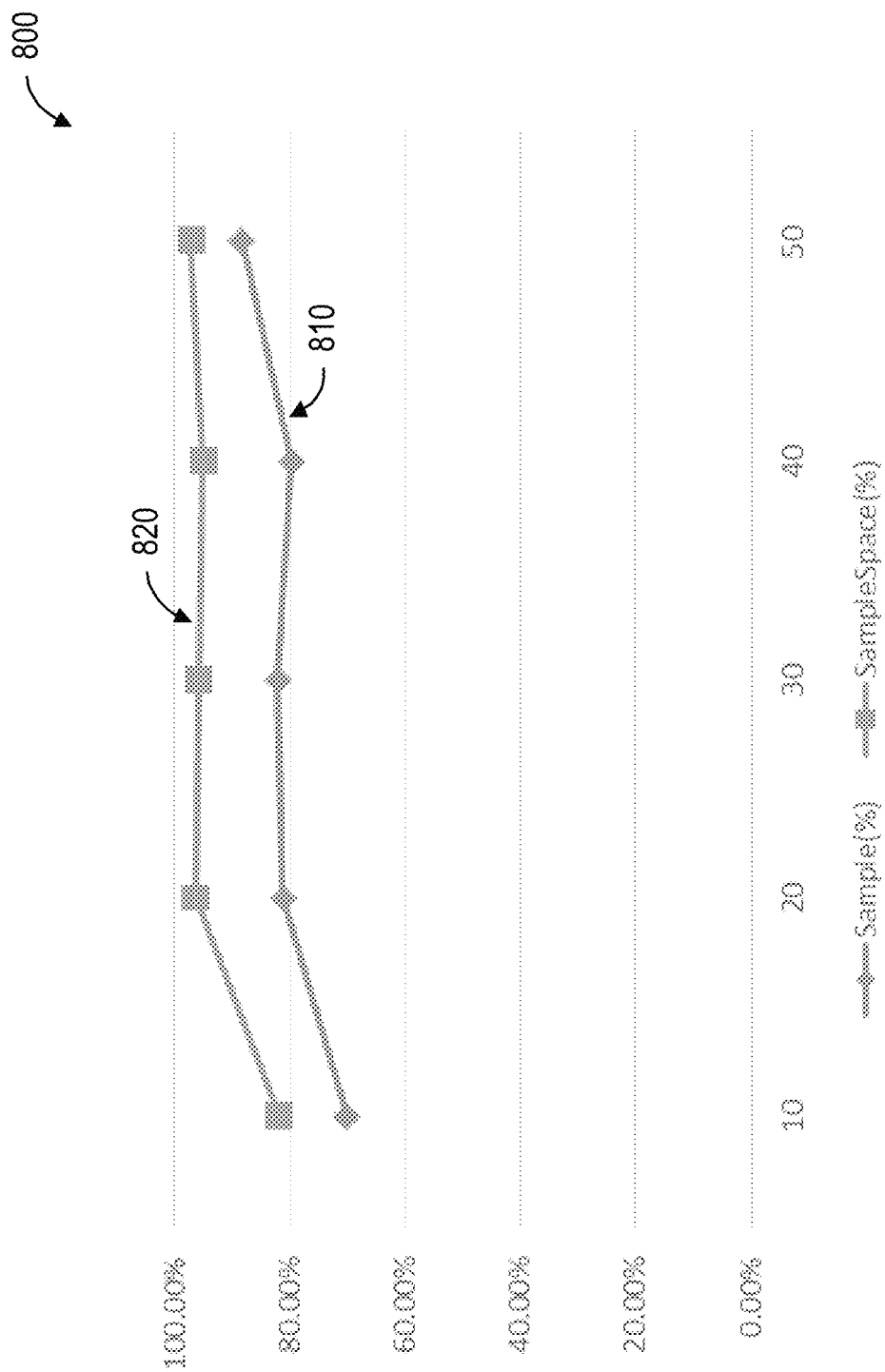
FIG. 8 is a graphical representation illustrating example pass rates for sampling modes, according to one or more embodiments described herein.
Figure 9:
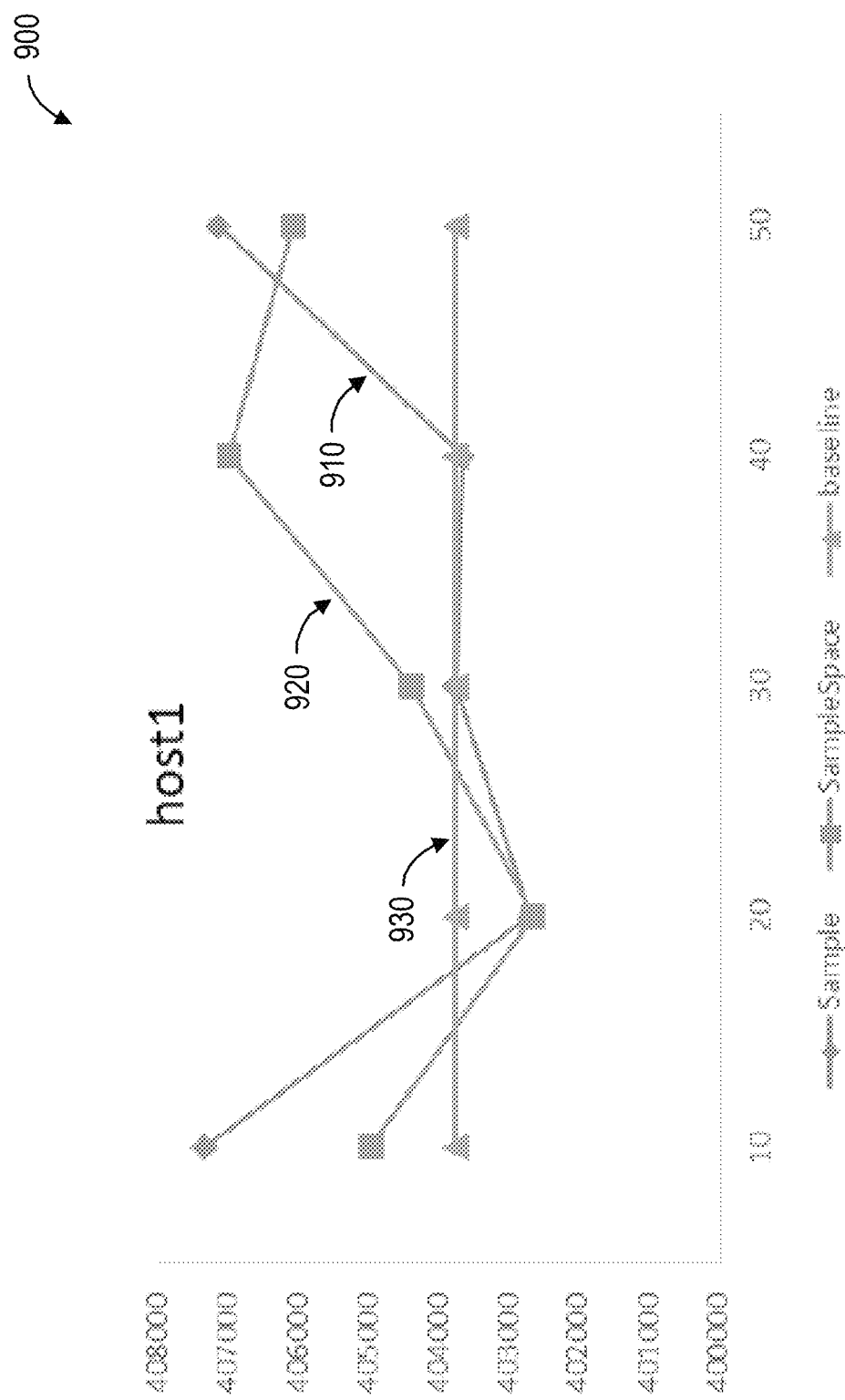
FIG. 9 is a graphical representation illustrating example instruction coverage for sampling modes for a host, according to one or more embodiments described herein.
Figure 10:
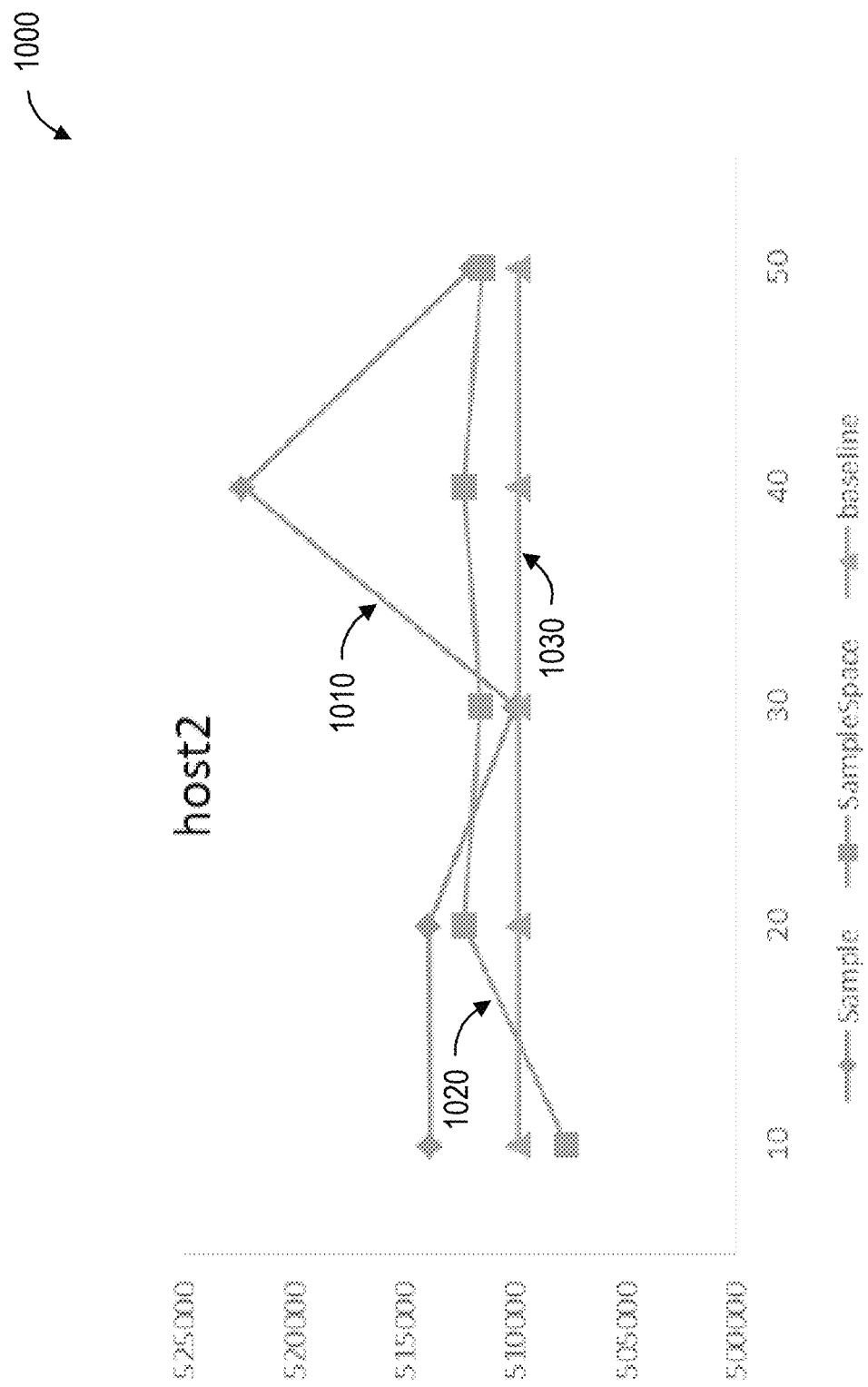
FIG. 10 is a graphical representation illustrating example instruction coverage for sampling modes for another host, according to one or more embodiments described herein.
Figure 11:
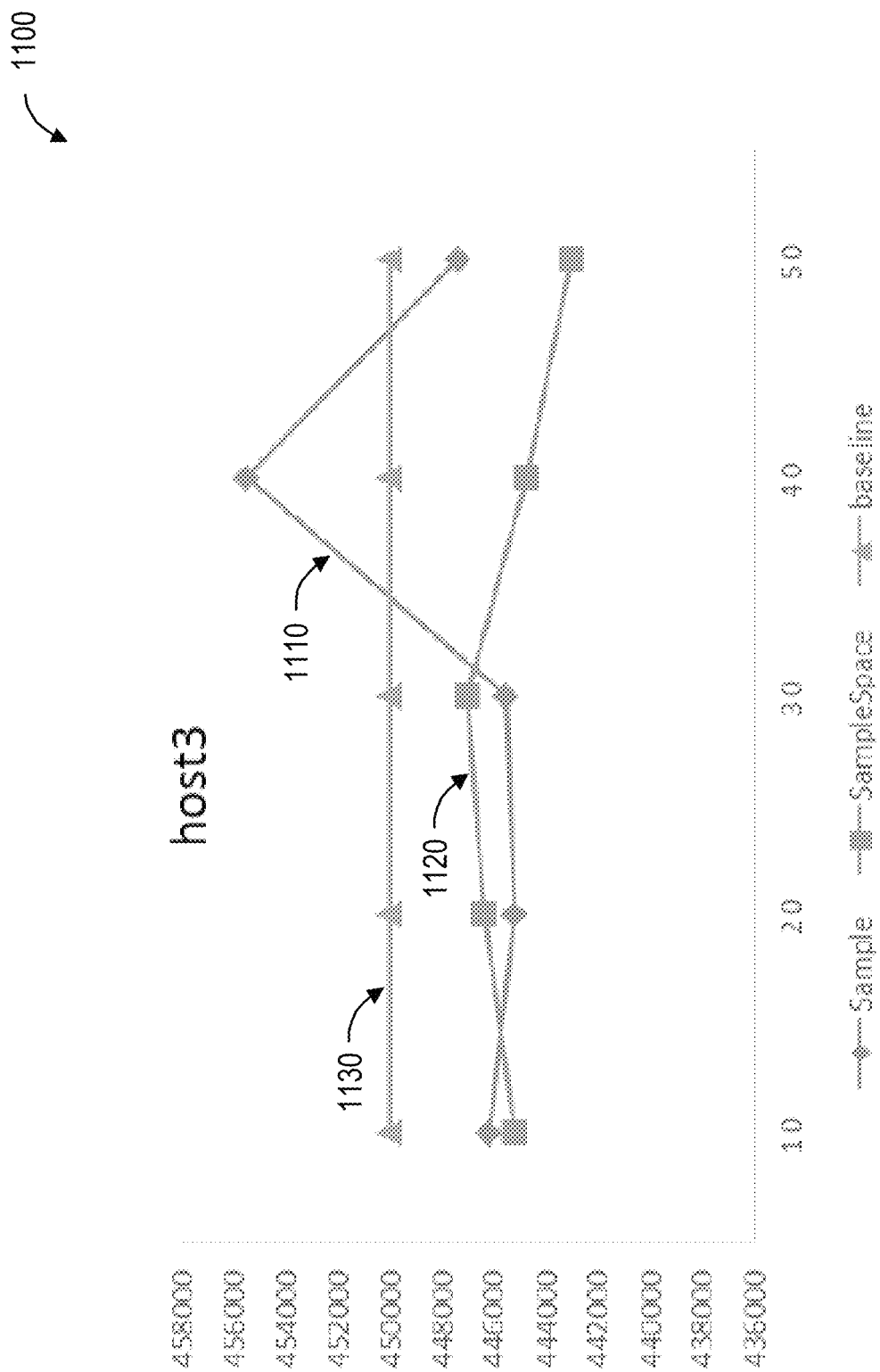
FIG. 11 is a graphical representation illustrating example instruction coverage for sampling modes for another host, according to one or more embodiments described herein.

FIG. 8 is a graphical representation 800 that illustrates example pass rates for Sample mode (810) and SampleSpace mode (820) when training with 10 to 50 epochs. The following should be noted with respect to the results shown in graphical representation 800:

(i) The pass rate for SampleSpace (820) is consistently better than the pass rate for Sample (810).

(ii) For 10 epochs only, the pass rate for Sample (810) is already above 70%. This indicates that the learning is of good quality.

(iii) As the number of epochs increases, the pass rate increases, as expected, since the learned models become more precise, yet they also take more time.

(iv) The best pass rate is 97%, obtained with SampleSpace (820) and 50 epochs.

It should also be noted that the pass rate is essentially the same regardless of the host PDF file being used (the pass rate varies by at most 0.1% across hosts (data not shown)).

In view of the above, it should be understood that the pass rate ranges between 70% and 97%, which indicates the learning is of high quality.

Coverage with Learned PDF Objects

FIGS. 9-12 are graphical representations (900, 1000, 1100, and 1200, respectively) illustrating example instruction coverage for Sample and SampleSpace from 10 to 50 epochs, for each of the three hosts and the union of these hosts, as well as the coverage obtained with the corresponding baselines. Graphical representation 900 shows example instruction coverage obtained with Sample (910) and SampleSpace (920) using host1, and the coverage obtained with the corresponding baseline (930) for host1. Graphical representation 1000 shows example instruction coverage obtained with Sample (1010) and SampleSpace (1020) using host2, and the coverage obtained with the corresponding baseline (1030) for host2. Graphical representation 1100 shows example instruction coverage obtained with Sample (1110) and SampleSpace (1120) using host3, and the coverage obtained with the corresponding baseline (1130) for host3. Graphical representation 1200 shows example instruction coverage obtained with Sample (1210) and SampleSpace (1220) using the union of the three sets, host123, and the coverage obtained with the corresponding combined baseline (1230) for host123. The following should be noted with respect to the results shown in graphical representations 900, 1000, 1100, and 1200:

(i) Unlike for the pass rate, the host impacts instruction coverage significantly, as was discussed above. Moreover, the shapes of each line vary across the different hosts.

(ii) For host1 and host2, the coverage for Sample and SampleSpace are above the respective baseline coverage for most epoch results, while for host3 and host123, the coverage for Sample and SampleSpace are mostly below the respective baseline coverage.

Figure 12:
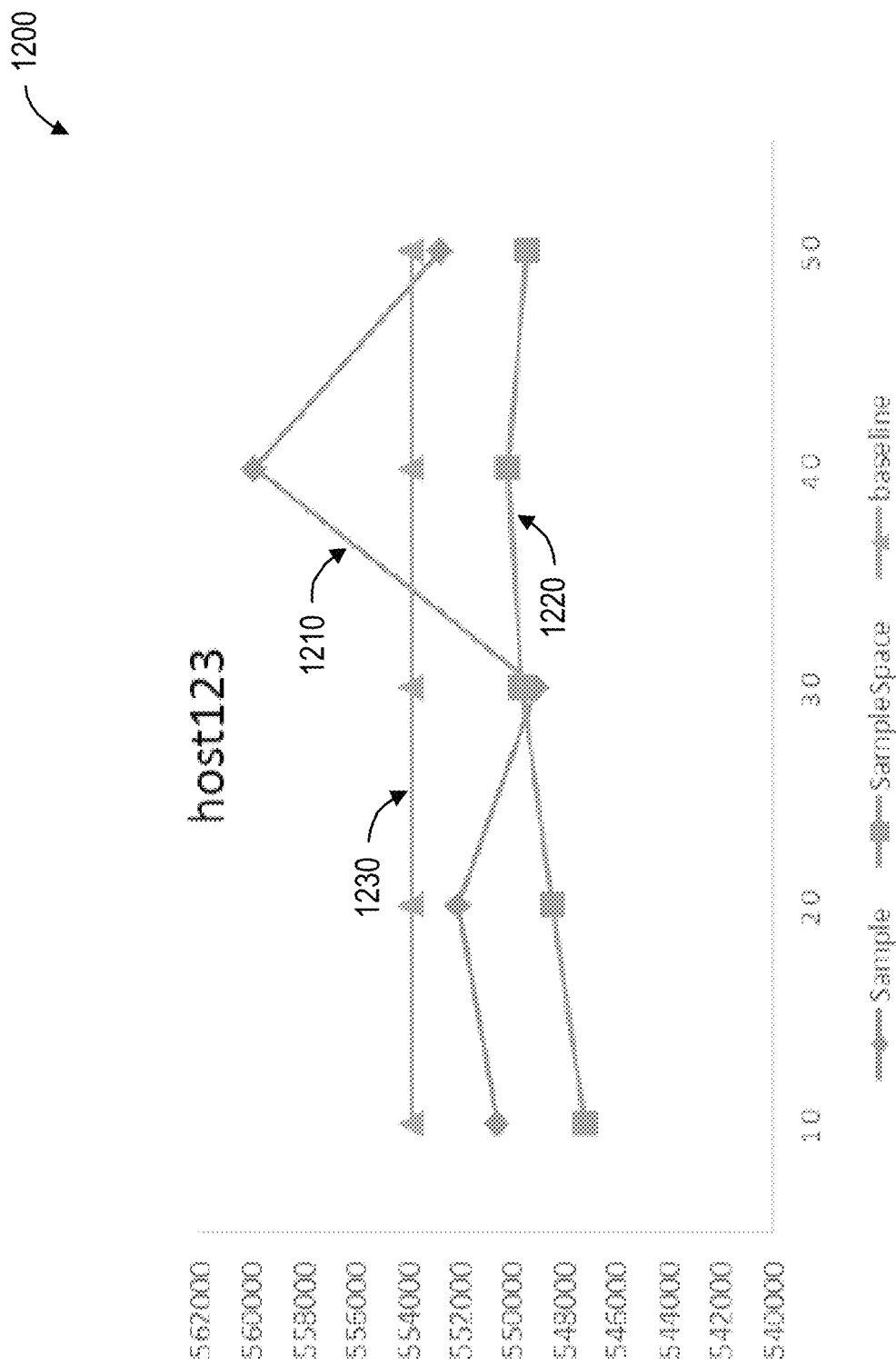
FIG. 12 is a graphical representation illustrating example instruction coverage for sampling modes for a union of hosts, according to one or more embodiments described herein.

(iii) The best overall coverage is obtained with Sample 40-epochs (see line 1210 in graphical representation 1200 shown in FIG. 12).

(iv) The baseline123 coverage (line 1230 in graphical representation 1200 shown in FIG. 12) is overall second best behind Sample 40-epochs.

(v) The best instruction coverage obtained with SampleSpace is also with 40-epochs (see line 1220 in graphical representation 1200 shown in FIG. 12).

Comparing Coverage Sets

Thus far, the example evaluation has simply counted the number of unique instructions being covered. However, the following describes in greater detail the overall host123 coverage data (shown in graphical representation 1200 of FIG. 12), and computes the overlap between overall coverage sets obtained with Sample 40-epochs and SampleSpace 40-epochs, as well as the baseline123 and host123 overall coverage.

FIG. 13 is a table 1300 that compares instruction coverage between Sample 40-epochs and SampleSpace 40-epochs, as well as the baseline123 and host123, showing unique instructions in each row compared to each column. The following should be noted with respect to the comparison results shown in table 1300:

(i) All sets are almost supersets of host123 (see the host123 row in table 1300), except for a few hundred instructions each.

(ii) Sample 40-epochs is almost a superset of all other sets, except for 1,680 instructions compared to SampleSpace 40-epochs, and a few hundred instructions compared to baseline123 and host123 (see the Sample-40e column in table 1100).

(iii) Sample 40-epochs and SampleSpace 40-epochs have significantly more instructions in common than they differ. In particular, Sample 40-epochs and SampleSpace 40-epochs have 10,799 instructions in common and only differ with respect to 1,680 instructions. Sample 40-epochs has better instruction coverage than SampleSpace 40-epochs.

(iv) SampleSpace 40-epochs is incomparable with baseline123: it has 3,393 more instructions, but also 6,514 missing instructions.

Combining Learning and Fuzzing

The following describes several ways to combine learning with fuzzing, one or more of which are utilized in some embodiments of the present disclosure, and also evaluates the effectiveness of each combination approach.

Initially, consider a widely-used simple blackbox random fuzzing algorithm, denoted Random, which randomly picks a position in a file and then replaces the byte value by a random value between 0 and 255. The algorithm uses a fuzz-factor of 100: the length of the file divided by 100 is the average number of bytes that are fuzzed in that file.

Random is used to generate 10 variants of every PDF object generated by 40-epochs (e.g., Sample-40e, SampleSpace-40, and baseline). The resulting fuzzed objects are re-combined with the three host files to obtain three sets of 30,000 new PDF files, denoted by "Sample+Random," "SampleSpace+Random," and "baseline+Random," respectively.

For comparison purposes, the results of running Sample-40e to generate 10,000 objects is also included, denoted by "Sample-10K."

In addition, the comparison considers the SampleFuzz process (e.g., process 600 shown in FIG. 6 and described in detail above) of the present disclosure, which decides where to fuzz values based on the learnt distribution. SampleFuzz was applied with the learnt distribution of the 40-epochs RNN model, $t_{fuzz}=0.9$, and a threshold $p_t=0.9$.

Figure 14:
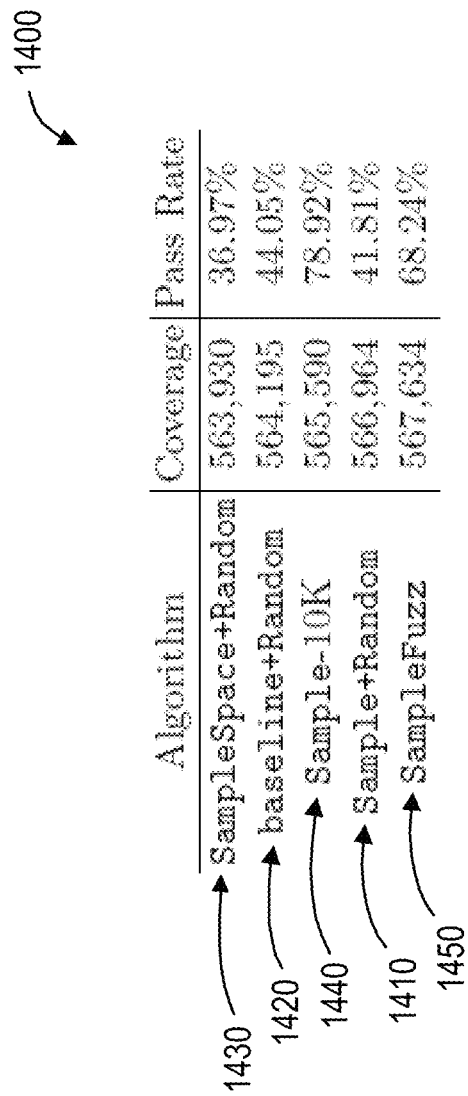
FIG. 14 illustrates a table showing example results of fuzzing experiments, according to one or more embodiments described herein.

FIG. 14 is a table 1400 showing the results of fuzzing experiments with 30,000 PDF files each, including the overall coverage and the pass rate for each set. The rows in table 1400 are sorted by increasing coverage. The following should be noted with respect to the results shown in table 1400:

(i) After applying Random on objects generated with Sample 1410, SampleSpace 1430, and baseline 1420, coverage goes up while the pass rate goes down: the pass rate is consistently below 50%.

(ii) After analyzing the overlap among coverage sets (data of analysis not shown), all fuzzed sets are almost supersets of their original non-fuzzed sets (which is as expected).

(iii) Coverage for Sample-10K 1440 also increases by 6,173 instructions compared to Sample, while the pass rate remains around 80% (which is as expected).

(iv) The best overall coverage is obtained with SampleFuzz 1450, and its pass rate is 68.24%.

(v) The difference in absolute coverage between SampleFuzz 1450 and the next best approach, Sample+Random 1410, is only 670 instructions. Moreover, after analyzing the coverage set overlap, SampleFuzz 1450 covers 2,622 more instructions than
Sample+Random 1410, but also misses 1,952 instructions covered by Sample+Random 1410. As such, it may be determined that neither of these two top-coverage approaches fully "simulate" the effects of the other.

In view of the above, it should be understood that all of the learning-based approaches considered are competitive in comparison to baseline+Random 1420. Also, three of the learning-based approaches beat the baseline coverage of baseline+Random 1420.

Tension Between Coverage and Pass Rate

One of the main takeaways from the example evaluations described above is the tension observed between the coverage and the pass rate. This tension is evident in the results shown in table 1400 of FIG. 14. However, the tension is also visible in earlier results. For example, if the coverage results shown in graphical representations 900, 1000, 1100, and 1200 (illustrated in FIGS. 9, 10, 11, and 12, respectively) are correlated with the pass-rate results shown in graphical representation 800 (of FIG. 8), it can clearly be seen that SampleSpace has a better pass rate than Sample, but Sample has a better overall coverage than SampleSpace (e.g., see graphical representation 1200 for host123, shown in FIG. 12).

Intuitively, this tension between coverage and pass rate can be explained as follows. A pure learning process (e.g., learning algorithm) with a nearly-perfect pass-rate (e.g., SampleSpace) generates almost only well-formed objects and exercises little error-handling code. In contrast, a noisier learning process (e.g., Sample) with a lower pass-rate can not only generate many well-formed objects, but also generates some ill-formed objects that exercise error-handling code.

Applying a random fuzzing process (e.g., Random) to previously-generated (nearly) well-formed objects has an even more dramatic effect on lowering the pass rate (e.g., see results shown in table 1400 of FIG. 14) while increasing coverage, again probably due to increased coverage of error-handling code.

In view of the above, the new SampleFuzz process (e.g., process 600 shown in FIG. 6 and described above) hits an optimal balance (e.g., a "sweet spot") between both pass rate and coverage. As indicated by the evaluations and experiments described above, the optimal pass rate appears to be around 65-70%. Such a pass rate is high enough to generate diverse well-formed objects that cover a substantial amount of code in the PDF parser, yet is also low enough to exercise error-handling code in many parts of the same parser.

It is important to note, however, that instruction coverage is ultimately a better indicator of fuzzing effectiveness than the pass rate, which is instead a learning-quality metric.

Bugs

In addition to coverage and pass rate, a third metric of interest is of course the number of bugs found. During the experiments described above, no bugs were found. It should be noted, however, that the particular PDF parser used in connection with the experiments had been thoroughly fuzzed and the identified bugs corrected.

Figure 15:
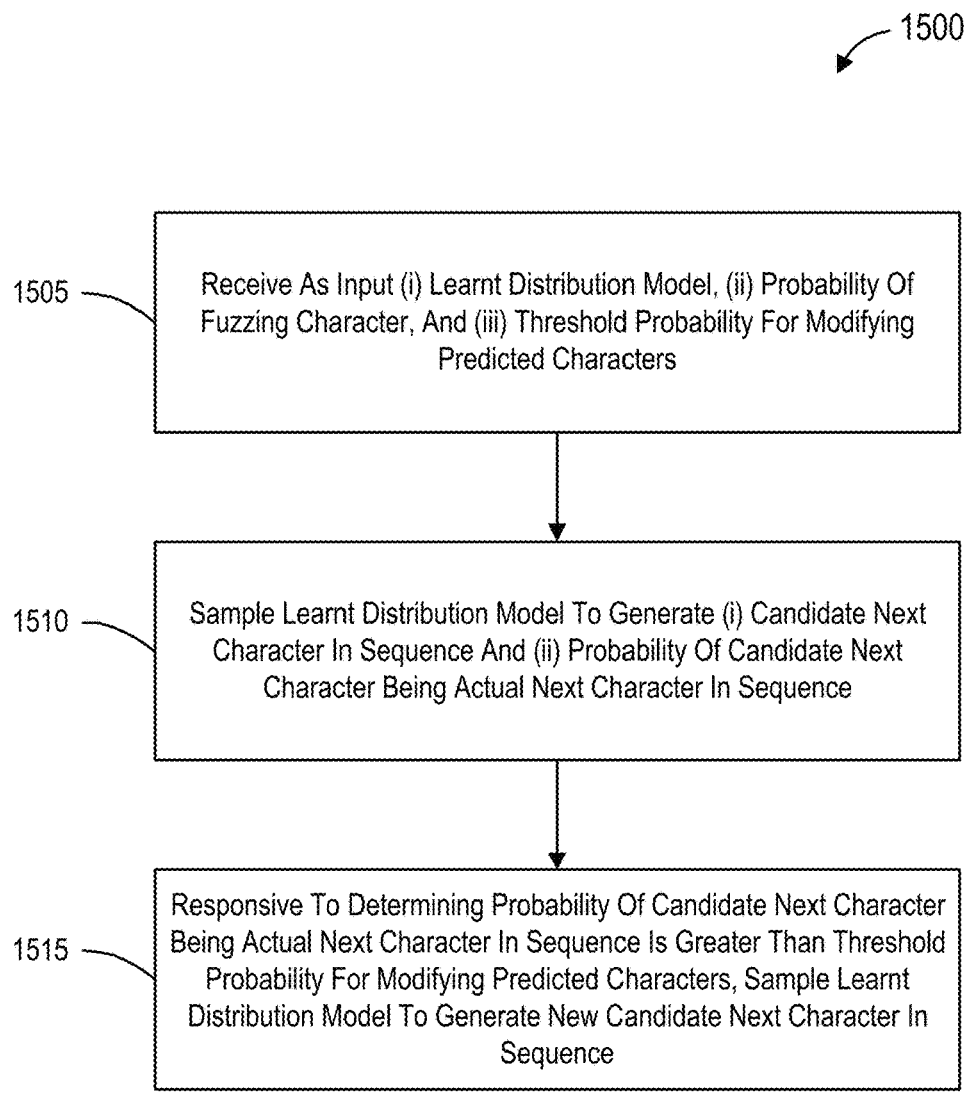
FIG. 15 is a flow diagram illustrating an example method for generating input grammars for grammar-based fuzzing using sample inputs, according to one or more embodiments.

FIG. 15 illustrates an example process 1500 for generating input grammars for grammar-based fuzzing using sample inputs, according to one or more embodiments. At block 1505, input may be received, where the input includes a learnt distribution model, a probability of fuzzing a character, and a threshold probability for modifying predicted characters. At block 1510, the learnt distribution model may be sampled to generate a candidate next character in a sequence and a probability of the candidate next character being an actual next character in the sequence. At block 1515, in response to determining that the probability of the candidate next character being the actual next character in the sequence is greater than the threshold probability for modifying predicted characters, the learnt distribution model may be sampled to generate a new candidate next character in the sequence, in an embodiment.

Most popular blackbox random fuzzers today support some form of grammar representation. Work on grammar-based test input generation is related to model-based testing. Test generation from a grammar is usually either random or exhaustive. Imperative generation is a related approach in which a custom-made program generates the inputs (in effect, the program encodes the grammar). Grammar-based fuzzing can also be combined with whitebox fuzzing.

One existing approach for learning grammars for grammar-based fuzzing involves an algorithm to synthesize a context-free grammar given a set of input examples, which is then used to generate new inputs for fuzzing. This algorithm uses a set of generalization steps by introducing repetition and alternation constructs for regular expressions, and merging non-terminals for context-free grammars, which in turn results in a monotonic generalization of the input language. This technique is able to capture hierarchical properties of input formats, but is not well suited for formats such as PDF objects, which are relatively flat but include a large diverse set of content types and key-value pairs. Instead, the methods and systems of the present disclosure uses sequence-to-sequence neural-network models to learn statistical generative models of such flat formats. Moreover, learning a statistical model also allows for guiding additional fuzzing of the generated inputs.

Another existing approach also learns (non-probabilistic) context-free grammars given a set of inputs, but by dynamically observing how inputs are processed in a program. This existing approach instruments the program under test with dynamic taints that tags memory with input fragments they come from. The parts of the inputs that are processed by the program become syntactic entities in the grammar. Another existing approach reverse engineers an input format from examples using a taint tracking mechanism that associates data structures with addresses in the application address space. Unlike the methods and system of the present disclosure, which treat the program under test as a black-box, these existing approaches require access to the program for adding instrumentation, are more complex, and their applicability and precision for complex formats such as PDF objects is unclear.

There have been some recent developments with using neural networks for program analysis and synthesis. Several neural architectures have been proposed to learn simple algorithms such as array sorting and copying. One existing approach uses neural architectures for encoding input-output examples and generating regular-expression-based programs in a domain specific language. Several seq2seq based models have been developed for learning to repair syntax errors in programs. These existing techniques learn a seq2seq model over a set of correct programs, and then use the learnt model to predict syntax corrections for buggy programs. Other related work optimizes assembly programs using neural representations. The methods and systems of the present disclosure, however, present a novel application of seq2seq models to learn grammars from sample inputs for fuzzing purposes, which has not been addressed or suggested in any existing technology.

Grammar-based fuzzing is effective for fuzzing applications with complex structured inputs provided a comprehensive input grammar is available. Therefore, embodiments of the present disclosure relate to methods and systems that use neural-network-based statistical learning techniques to automatically generate input grammars from sample inputs. The methods and systems presented and evaluated above leverage recent advances in sequence learning by neural networks (e.g., seq2seq recurrent neural networks) to automatically learn a generative model of PDF objects. In one or more embodiments, the methods and systems are designed to utilize various sampling techniques to generate new PDF objects from the learnt distribution. The above description shows that the learnt models are not only able to generate a large set of new well-formed objects, but also results in increased coverage of the PDF parser used in the example experiments, compared to various forms of random fuzzing.

While the various evaluation results presented above may vary for other applications, the observations made about the tension between conflicting learning and fuzzing goals will remain valid: learning wants to capture the structure of well-formed inputs, while fuzzing wants to break that structure in order to cover unexpected code paths and find bugs. Accordingly, the inherent statistical nature of learning by neural networks is a powerful tool to address this challenge.

It should be noted that while the present disclosure focused primarily on learning the structure of PDF objects, one or more embodiments may include automatically learning the higher-level hierarchical structure of PDF documents involving cross-reference tables, object bodies, and trailer sections that maintain certain complex invariants amongst them. For example, a combination of logical inference techniques with neural networks could be powerful enough to achieve this. Also, while in some embodiments the learning process is agnostic to the application under test, in other embodiments the process uses some form of reinforcement learning to guide the learning of seq2seq models with coverage feedback from the application, which guides the learning more explicitly towards increasing coverage.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While particular embodiments of the subject matter have thus been described, it is to be appreciated that other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multi-tasking and parallel processing may be advantageous.

What is claimed is:

1. A method for generating input for testing an application, the method comprising:
    receiving as input, at a server, (i) a learnt distribution model of Portable Document Format (PDF) object characters, (ii) a probability of fuzzing a character, and (iii) a threshold probability for modifying predicted characters;
    sampling, at the server, the learnt distribution model to generate (i) a candidate next character in a sequence of characters in a PDF object and (ii) a probability of the candidate next character being an actual next character in the sequence;
    responsive to determining that the probability of the candidate next character being the actual next character in the sequence is greater than the threshold probability for modifying predicted characters, sampling, at the server, the learnt distribution model to generate a new candidate next character in the sequence; and
    generating an input for testing the application using the new candidate next character in the sequence.

2. The method of claim 1, wherein sampling the learnt distribution model to generate the new candidate next character in the sequence includes sampling, at the server, the learnt distribution model to generate a character having a minimum probability in the learnt distribution model.

3. The method of claim 1, wherein sampling the learnt distribution model to generate the candidate next character in the sequence includes:
    using, at the server, the learnt distribution model to select a top predicted character in the sequence based on a prefix.

4. The method of claim 1, wherein sampling the learnt distribution model to generate the candidate next character in the sequence includes:
    sampling, at the server, the learnt distribution model to generate the candidate next character only when the current prefix sequence ends with a whitespace.

5. The method of claim 1, wherein the probability of the candidate next character being the actual next character in the sequence is based on a timestamp associated with the sequence.

6. The method of claim 1, wherein the probability of fuzzing a character is an input parameter from a user.

7. The method of claim 1, wherein sampling the learnt distribution model to generate a new candidate next character in the sequence occurs only if (i) the probability of the candidate next character being the actual next character in the sequence is greater than the threshold probability for modifying predicted characters, and (ii) a probability of a random event is higher than the probability of fuzzing a character.

8. A system for generating input for testing an application, comprising:
    one or more processors; and
    one or more non-transitory memories coupled to the one or more processors, the one or more memories storing machine readable instructions that, when executed by the one or more processors, cause a system to perform operations comprising:
        receiving as input, (i) a learnt distribution model of Portable Document Format (PDF) object characters, (ii) a probability of fuzzing a character, and (iii) a threshold probability for modifying predicted characters;
        sampling the learnt distribution model to generate (i) a candidate next character in a sequence of characters in a PDF object and (ii) a probability of the candidate next character being an actual next character in the sequence;
        responsive to determining that the probability of the candidate next character being the actual next character in the sequence is greater than the threshold probability for modifying predicted characters, sampling the learnt distribution model to generate a new candidate next character in the sequence; and
        generating an input for testing the application using the new candidate next character in the sequence.

9. The system of claim 8, wherein the one or more memories further store machine readable instructions that, when executed by one or more processors, cause the one or more processors to perform operations comprising:
    sampling the learnt distribution model to generate a character having a minimum probability in the learnt distribution model.

10. The system of claim 8, wherein the one or more memories further store machine readable instructions that, when executed by one or more processors, cause the one or more processors to perform operations comprising:
    using the learnt distribution model to select a top predicted character in the sequence based on a prefix.

11. The system of claim 8, wherein the one or more memories further store machine readable instructions that, when executed by one or more processors, cause the one or more processors to perform operations comprising:
    sampling the learnt distribution model to generate the candidate next character only when the current prefix sequence ends with a whitespace.

12. The system of claim 8, wherein the probability of the candidate next character being the actual next character in the sequence is based on a timestamp associated with the sequence.

13. The system of claim 8, wherein the probability of fuzzing a character is an input parameter from a user.

14. The system of claim 8, wherein sampling the learnt distribution model to generate a new candidate next character in the sequence occurs only if (i) the probability of the candidate next character being the actual next character in the sequence is greater than the threshold probability for modifying predicted characters, and (ii) a probability of a random event is higher than the probability of fuzzing a character.

15. A tangible, non-transitory computer readable medium storing machine readable instructions that, when executed by one or more processors, cause the one or more processors to perform operations comprising:
- receiving as input, (i) a learnt distribution model of Portable Document Format (PDF) object characters, (ii) a probability of fuzzing a character, and (iii) a threshold probability for modifying predicted characters;
- sampling the learnt distribution model to generate (i) a candidate next character in a sequence of characters in a PDF object and (ii) a probability of the candidate next character being an actual next character in the sequence;
- responsive to determining that the probability of the candidate next character being the actual next character in the sequence is greater than the threshold probability for modifying predicted characters, sampling the learnt distribution model to generate a new candidate next character in the sequence; and
- generating an input for testing the application using the new candidate next character in the sequence.

16. The computer readable medium of claim 15, wherein the computer readable medium further stores machine readable instructions that, when executed by the one or more processors, cause the one or more processors to perform operations comprising:
- sampling the learnt distribution model to generate a character having a minimum probability in the learnt distribution model.

17. The computer readable medium of claim 15, wherein the computer readable medium further stores machine readable instructions that, when executed by the one or more processors, cause the one or more processors to perform operations comprising:
- using the learnt distribution model to select a top predicted character in the sequence based on a prefix.

18. The computer readable medium of claim 15, wherein the computer readable medium further stores machine readable instructions that, when executed by the one or more processors, cause the one or more processors to perform operations comprising:
- sampling the learnt distribution model to generate the candidate next character only when the current prefix sequence ends with a whitespace.

19. The computer readable medium of claim 15, wherein the probability of the candidate next character being the actual next character in the sequence is based on a timestamp associated with the sequence.

20. The computer readable medium of claim 15, wherein sampling the learnt distribution model to generate a new candidate next character in the sequence occurs only if (i) the probability of the candidate next character being the actual next character in the sequence is greater than the threshold probability for modifying predicted characters, and (ii) a probability of a random event is higher than the probability of fuzzing a character.

* * * * *